United States Patent
Jang et al.

(10) Patent No.: US 9,335,767 B2
(45) Date of Patent: May 10, 2016

(54) ROBOT CLEANER AND CONTROL METHOD THEREOF

(75) Inventors: Hwi Chan Jang, Gyeonggi-do (KR); Dong Won Kim, Gyeonggi-do (KR); Hyun Soo Jung, Gyeonggi-do (KR); Seung Il Han, Gyeonggi-do (KR); Jun Hwa Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 286 days.

(21) Appl. No.: 13/590,720

(22) Filed: Aug. 21, 2012

(65) Prior Publication Data

US 2013/0054026 A1 Feb. 28, 2013

(30) Foreign Application Priority Data

Aug. 22, 2011 (KR) .................. 10-2011-0083597

(51) Int. Cl.
*G05D 1/02* (2006.01)

(52) U.S. Cl.
CPC ........... *G05D 1/0227* (2013.01); *A47L 2201/04* (2013.01); *G05D 2201/0203* (2013.01)

(58) Field of Classification Search
USPC ................................ 702/98; 700/245; 15/319
See application file for complete search history.

(56) References Cited

U.S. PATENT DOCUMENTS

| | | | |
|---|---|---|---|
| 6,047,244 A * | 4/2000 | Rud, Jr. | G01D 3/024 375/295 |
| 7,188,000 B2 | 3/2007 | Chiappetta et al. | |
| 7,275,280 B2 | 10/2007 | Haegermarck | |
| 7,441,298 B2 | 10/2008 | Svendsen et al. | |
| 7,581,282 B2 * | 9/2009 | Woo | A47L 9/009 15/319 |
| 8,253,368 B2 | 8/2012 | Landry et al. | |
| 8,386,081 B2 | 2/2013 | Landry et al. | |
| 8,417,383 B2 * | 4/2013 | Ozick | G05D 1/0231 700/245 |
| 8,428,778 B2 | 4/2013 | Landry et al. | |
| 8,560,119 B2 | 10/2013 | Lee et al. | |
| 8,781,626 B2 | 7/2014 | Landry et al. | |

(Continued)

FOREIGN PATENT DOCUMENTS

| CN | 1401289 | 3/2003 |
|---|---|---|
| CN | 1636491 | 7/2005 |

(Continued)

OTHER PUBLICATIONS

European Search Report mailed Jan. 3, 2013 in corresponding European Application No. 12180676.4.

(Continued)

*Primary Examiner* — Thomas G Black
*Assistant Examiner* — Ana Thomas
(74) *Attorney, Agent, or Firm* — Staas & Halsey LLP

(57) ABSTRACT

A robot cleaner having an improved structure which executes a cleaning operation without stoppage of travelling of the robot cleaner due to obstacles present in a space to be cleaned, and a control method thereof. The control method of the robot cleaner which is provided with a main body, driving wheels driving the main body, and driving wheel assemblies, each of which includes each driving wheel, includes detecting displacement of each driving wheel with respect to a reference position by sensing a sensed body provided on each driving wheel assembly, judging whether or not the displacement is within a predetermined reference range, and changing a travelling path of the main body, upon judging that the displacement deviates from the reference range.

27 Claims, 42 Drawing Sheets

(56) References Cited

U.S. PATENT DOCUMENTS

| | | |
|---|---|---|
| 2001/0008985 A1 | 7/2001 | Wada |
| 2004/0211444 A1 | 10/2004 | Taylor |
| 2004/0236468 A1 | 11/2004 | Taylor |
| 2004/0244138 A1 | 12/2004 | Taylor |
| 2005/0132522 A1 | 6/2005 | Im et al. |
| 2006/0060216 A1 | 3/2006 | Woo |
| 2006/0111814 A1 | 5/2006 | Hachitani et al. |
| 2007/0016328 A1* | 1/2007 | Ziegler ............ A47L 5/14 700/245 |
| 2007/0233321 A1 | 10/2007 | Suzuki |
| 2008/0065265 A1 | 3/2008 | Ozick et al. |
| 2008/0282484 A1* | 11/2008 | Lai ............ C09B 67/0047 8/549 |
| 2008/0282494 A1* | 11/2008 | Won et al. ............ 15/319 |
| 2009/0071732 A1* | 3/2009 | Kim ............ B60G 3/01 180/24.07 |
| 2009/0254218 A1* | 10/2009 | Sandin ............ G05D 1/028 700/258 |
| 2010/0037418 A1 | 2/2010 | Hussey et al. |
| 2010/0115716 A1 | 5/2010 | Landry et al. |
| 2010/0324734 A1 | 12/2010 | Lee et al. |
| 2013/0054022 A1* | 2/2013 | Jang ............ A47L 9/2805 700/245 |
| 2013/0211589 A1 | 8/2013 | Landry et al. |

FOREIGN PATENT DOCUMENTS

| | | |
|---|---|---|
| CN | 102119092 | 7/2011 |
| EP | 1 931 010 A2 | 6/2008 |
| WO | WO 2006/089307 A2 | 8/2006 |
| WO | WO 2007/065034 A1 | 6/2007 |
| WO | WO 2010/018530 A1 | 2/2010 |

OTHER PUBLICATIONS

Chinese Office Action issued Oct. 23, 2015 in Chinese Patent Application No. 201210295618.6.
Office Action issued Jun. 6, 2014 in U.S. Appl. No. 13/557,707.
Office Action issued Nov. 5, 2014 in U.S. Appl. No. 13/557,707.
Office Action issued Jun. 2, 2015 in U.S. Appl. No. 13/557,707.
Notice of Allowance issued Oct. 5, 2015, in U.S. Appl. No. 13/557,707.
U.S. Appl. No. 13/557,707, filed Jul. 25, 2012.

* cited by examiner

ROBOT CLEANER AND CONTROL METHOD THEREOF

CROSS-REFERENCE TO RELATED APPLICATIONS

This application claims the priority benefit of Korean Patent Application No. 10-2011-0083597, filed on Aug. 22, 2011 in the Korean Intellectual Property Office, the disclosure of which is incorporated herein by reference.

BACKGROUND

1. Field

Example embodiments of the following disclosure relate to a robot cleaner that executes a cleaning operation, while avoiding various obstacles, which are present in a space to be cleaned, and a control method thereof.

2. Description of the Related Art

In general, a robot cleaner is an apparatus, which uses suction to remove foreign substances or particles, such as dust, from a floor surface to clean a region of the floor surface to be cleaned while autonomously travelling about the region to be cleaned without being manipulated by a user. Such a robot cleaner detects through various sensors an obstacle, such as a piece of furniture, office supplies, or a wall, located within the region to be cleaned, and cleans the region while travelling without colliding with the obstacle, using the detected information.

Cleaning of a given region using the robot cleaner means a process of repeatedly executing a cleaning operation of the robot cleaner while travelling along a predetermined travelling pattern. In the region where such a robot cleaner travels, obstacles, such as an object, a piece of furniture, etc., having a projection or an inclined surface may be present. These obstacles may cause lifting of the driving wheels of the robot cleaner (hereinafter, referred to as 'lifting') and jamming of a main body of the robot cleaner into a narrow space (hereinafter, referred to as 'jamming') during a process of executing the cleaning operation of the robot cleaner, thus causing a travelling disenable state, and preventing the robot cleaner from properly executing the cleaning operation.

Generally, robot cleaners are not provided with sensors sensing such 'lifting' or 'jamming'. However, generally robot cleaners are provided with sensors which execute limited functions by sensing such a travelling disenable state and stopping driving of the robot cleaner under the condition that the robot cleaner may not travel due to the 'lifting' or 'jamming', and thus, may not avoid an obstacle prior to 'lifting' or 'jamming' or not effectively overcome 'lifting' or 'jamming'.

SUMMARY

Therefore, it is an aspect of the present disclosure to provide a robot cleaner having an improved structure which executes a cleaning operation without stoppage of travelling of the robot cleaner due to obstacles present in a space to be cleaned, and a control method thereof.

Additional aspects of the disclosure will be set forth in part in the description which follows and, in part, will be obvious from the description, or may be learned by practice of the disclosure.

In accordance with one aspect of the present disclosure, a control method of a robot cleaner which is provided with a main body, driving wheels driving the main body, and driving wheel assemblies, each of which includes each driving wheel, includes detecting displacement of each driving wheel with respect to a reference position by sensing a sensed body provided on each driving wheel assembly, judging whether or not the displacement is within a predetermined reference range, and changing a travelling path of the main body, upon judging that the displacement deviates from the reference range.

Each driving wheel assembly may include a sensor to sense the sensed body, and the sensor may sense a separation distance between the sensor and the sensed body.

Each driving wheel assembly may further include a driving motor to drive each driving wheel, and the sensor may sense a rotating angle of the sensed body about a rotation shaft of the driving motor.

The sensed body may be each driving wheel.

The travelling path of the main body may be changed so that the displacement is within the reference range, upon judging that the displacement deviates from the reference range.

The change of the travelling path of the main body may include judging that each driving wheel is lifted, if the displacement exceeds an upper threshold value of the reference range, and judging that each driving wheel is jammed, if the displacement does not reach a lower threshold value of the reference range.

Further, the sensed separation distance is converted into a standardized parameter. The standardized parameter may be voltage, and thus, the predetermined reference range may be a range of voltage.

In accordance with another aspect of the present disclosure, a robot cleaner which is provided with a main body, driving wheels driving the main body, and driving wheel assemblies, each of which includes each driving wheel, includes a sensor detecting displacement of each driving wheel with respect to a reference position by sensing a sensed body provided on each driving wheel assembly, and a controller judging whether or not the displacement is within a predetermined reference range, and changing a travelling path of the main body, upon judging that the displacement deviates from the reference range.

The controller may change the travelling path of the main body so that the displacement is within the reference range, upon judging that the displacement deviates from the reference range.

The controller may judge that each driving wheel is lifted, if the displacement exceeds an upper threshold value of the reference range, and may judge that each driving wheel is jammed, if the displacement does not reach a lower threshold value of the reference range.

The sensor may sense a separation distance between the sensor and the sensed body.

Each driving wheel assembly may include a housing, a driving motor connected to one side of the housing, and a gear assembly disposed between the driving motor and each driving wheel and transmitting driving force of the driving motor to each driving wheel, and the sensed body may protrude from one side surface of the gear assembly.

The gear assembly may be connected to one side of the housing so as to be rotatable about a rotation shaft of the driving motor.

A magnet may be provided at one end of the sensed body, and the sensor may sense the separation distance between the sensor and the sensed body through magnetic interaction with the magnet.

A guide slot accommodating the sensed body and guiding the sensed body may be provided at one side surface of the housing, and the sensor may be fixed to the guide slot and sense the separation distance between the sensor and the sensed body.

Each driving wheel assembly may include a housing and a driving motor connected to one side of the housing, and the sensor may sense a rotating angle of the sensed body about a rotation shaft of the driving motor.

The sensed body may be each driving wheel.

In accordance with another aspect of the present disclosure, a robot cleaner includes a main body, driving wheel assemblies, each of which includes a driving wheel driving the main body, a driving motor generating rotary force to rotate the driving wheel, and a sensed body driven in connection with the driving wheel, and sensors, each of which detects displacement of the driving wheel with respect to a reference position by sensing a distance with the sensed body.

Each driving wheel assembly may further include a housing accommodating and supporting various parts therein and a gear assembly connected to the driving motor and the driving wheel within the housing and transmitting driving force of the driving motor to the driving wheel.

The gear assembly may be connected to the driving motor and the driving wheel so as to be rotatable about a rotation shaft of the driving motor.

The sensed body may protrude from one side surface of the gear assembly.

The housing may include a guide part accommodating and guiding the sensed body, and the sensor may be fixed to the guide part and senses the distance with the sensed body.

In accordance with a further aspect of the present disclosure, a robot cleaner includes a main body, driving wheels driving the main body, driving motors, each of which generates rotary force to rotate each driving wheel, gear assemblies, each of which is connected to each driving motor and each driving wheel so as to be rotatable about a rotation shaft of each driving motor, and transmits rotary force of each driving motor to each driving wheel, and sensors, each of which detects displacement of each driving wheel with respect to a reference position by sensing a distance with each driving wheel.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
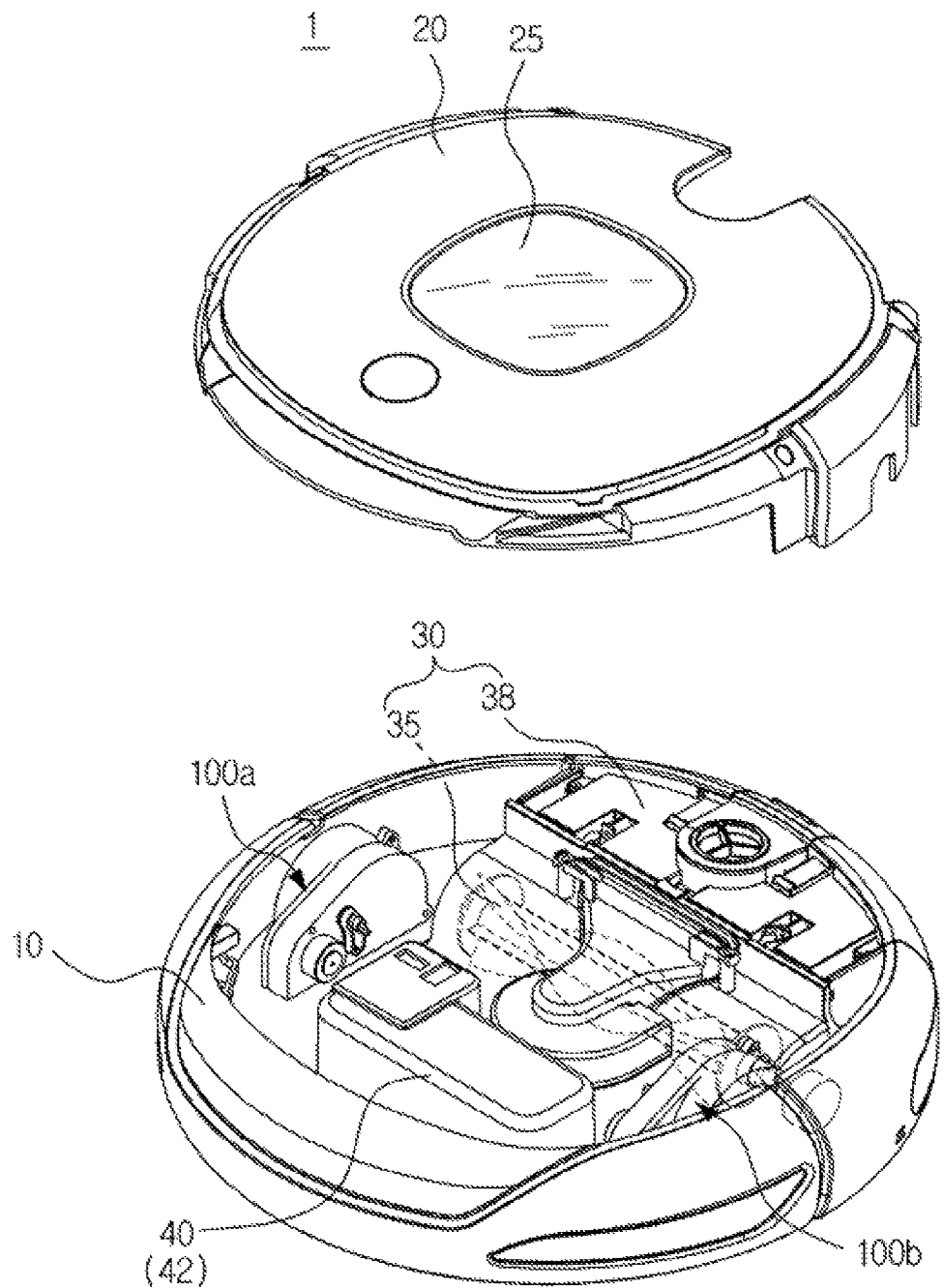
FIG. 1 is a perspective view illustrating the configuration of a robot cleaner in accordance with an example embodiment.

Reference will now be made in detail to the embodiments of the present disclosure, examples of which are illustrated in the accompanying drawings, wherein like reference numerals refer to like elements throughout.

FIG. 1 is a perspective view illustrating the configuration of a robot cleaner 1 in accordance with an embodiment.

As shown in FIG. 1, the robot cleaner 1 in accordance with an example embodiment includes a main body 10 forming the external appearance of the robot cleaner 1, a cover 20 covering the upper portion of the main body 10, a brush unit 30 sweeping or scattering dust off a space to be cleaned, a power unit 40 supplying driving power to drive the main body 10, and driving wheel assemblies 100a and 100b driving the main body 10.

The main body 10 forms the external appearance of the robot cleaner 1 and supports various parts installed within the main body 10.

The cover 20 includes a transmitting window 25 transmitting light generated from an upper camera unit (not shown) to photograph an upper image perpendicular to the travelling direction of the main body 10.

The brush unit 30 includes a main brush 35 mounted at an inlet (not shown) formed at the lower portion of the main body 10, a main brush motor (not shown) rotating the main brush 35, and a dust case 38 collecting foreign substances, such as dust gathered by the main brush 35.

The main brush 35 sweeps or scatters dust off a floor surface under the main body 10, thereby improving dust suction efficiency. Such a main brush 35 has a drum shape, and includes a roller and brush. The brush unit 30 may further include side brushes (not shown) disposed at both sides of the main brush 35 to sweep dust off a region which the main brush 35 may not approach, thereby improving cleaning efficiency.

The power unit 40 includes driving motors 130 (refer to FIG. 2) rotating driving wheels 120 (refer to FIG. 2), and a battery 42 electrically connected to the main brush motor (not shown) rotating the main brush 35 and respective driving units driving the main body 10 and supplying driving power.

The battery 42 is a second battery which is rechargeable, and is charged with power supplied from a docking station (not shown) when the main body 10 completes a cleaning process and is then connected to the docking station (not shown).

The driving wheel assemblies 100a and 100b are respectively provided at both sides of the center of the main body 10, and allow the main body 10 to execute moving operations, such as forward movement, backward movement, rotation, etc., during the cleaning process. Hereinafter, the driving wheel assembly 100a located at the right side in the forward movement direction of the main body 10 will be exemplarily described, and a description which will be given later is applied to the driving wheel assembly 100b located at the left side in the forward movement direction of the main body 10, unless mentioned otherwise.

Figure 2:
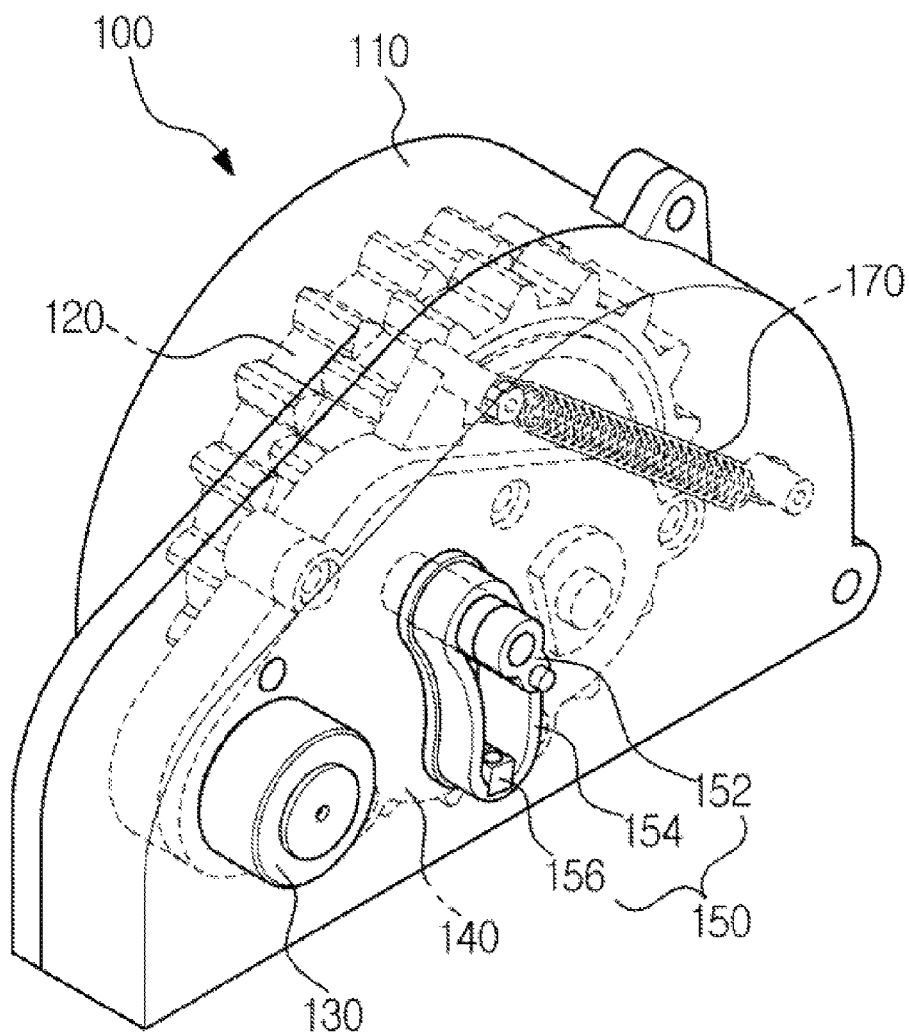
FIG. 2 is a perspective view illustrating a driving wheel assembly in accordance with an example embodiment, extracted from FIG. 1.
Figure 3:
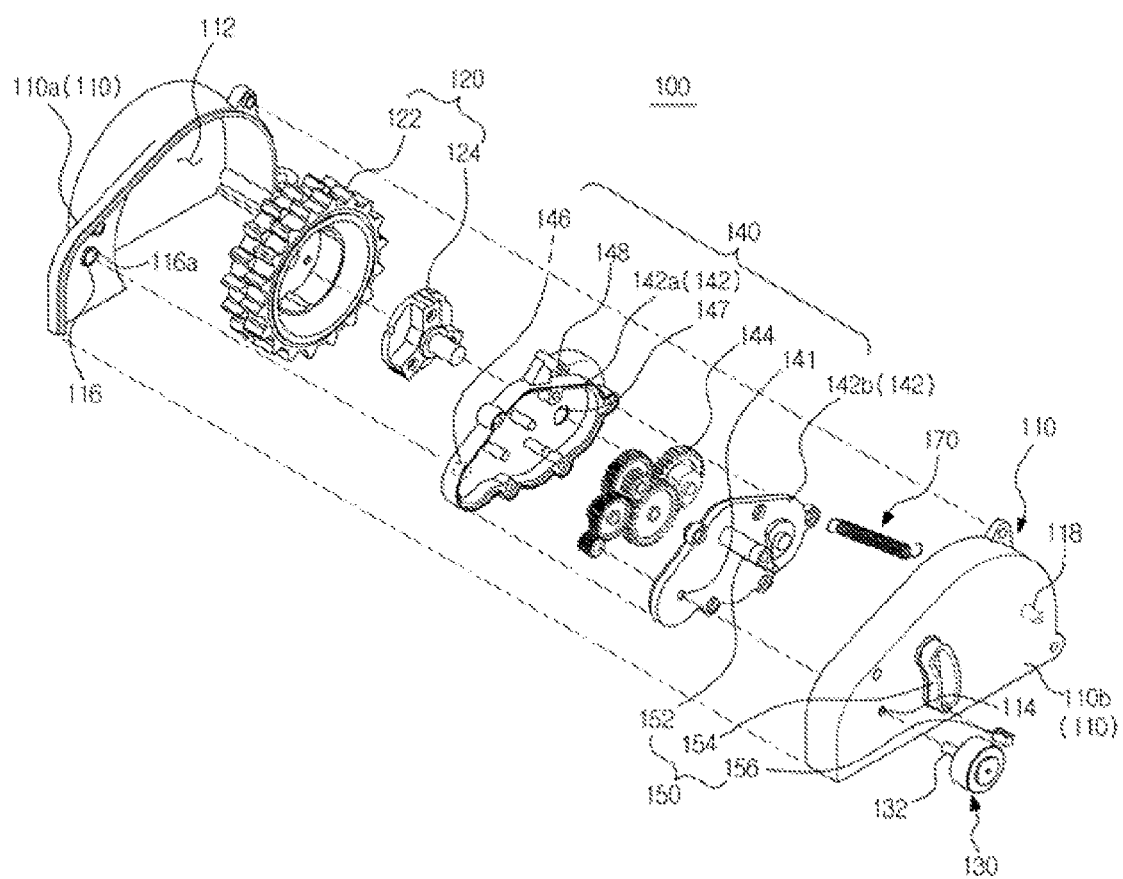
FIG. 3 is an exploded perspective view of the driving wheel assembly, as shown in FIG. 2.
Figure 4:
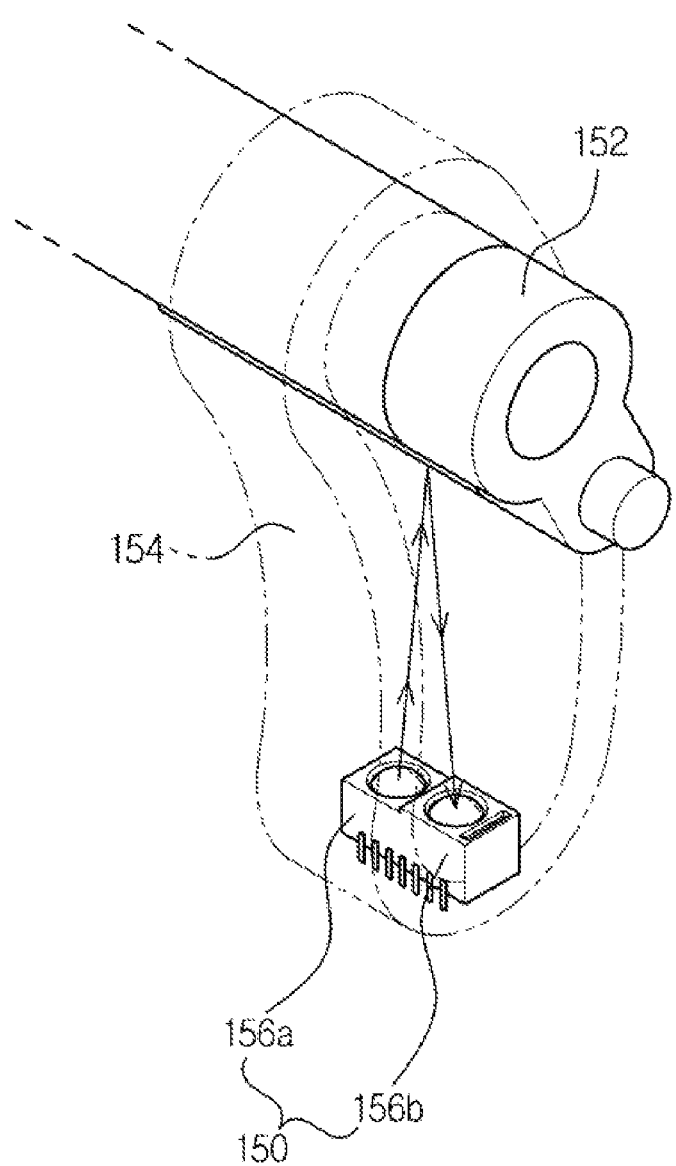
FIG. 4 is a perspective view illustrating a sensor and a sensed body extracted from the driving wheel assembly, as shown in FIG. 2.

FIG. 2 is a perspective view illustrating a driving wheel assembly in accordance with an example embodiment, extracted from FIG. 1. FIG. 3 is an exploded perspective view of the driving wheel assembly shown in FIG. 2. FIG. 4 is a perspective view illustrating a sensor and a sensed body extracted from the driving wheel assembly shown in FIG. 2.

As shown in FIGS. 2 to 4, the driving wheel assembly 100a includes a housing 110, the driving wheel 120 driving the main body 10, a driving motor 130 connected to one side of the housing 110 and rotating the driving wheel 120, a gear assembly 140 disposed between the driving wheel 120 and the driving motor 130 and transmitting driving force of the driving motor 130 to the driving wheel 120, and a sensing unit 150 detecting displacement of the driving wheel 120.

The housing 110 includes an accommodation part 112 accommodating the driving wheel 120 and the gear assembly 140, a first connection hole 114 to which the driving motor 130 is connected, a first connection protrusion 116 connected to the gear assembly 140, and a first support rib 118 supporting one end of an elastic member 170.

The lower portion of the accommodation part 112 is open so that the gear assembly 140 connected to the housing 110 and the driving wheel 120 connected to the gear assembly 140 may move upwards and downwards according to the kind and state of a floor surface of the region to be cleaned.

The first connection hole 114 is formed on one side surface 110b of the housing 110, and allows a rotation shaft 132 of the driving motor 130 to be connected to the gear assembly 140 within the housing 110.

The first connection protrusion 116 protrudes from the inner plane of the other side surface 110a opposite the side surface 110b of the housing 110, to which the driving motor 130 is connected, to the inside of the housing 110 by a designated length. An accommodation hole 116a rotatably accommodating a second connection protrusion 146 of the gear assembly 140 so as to allow the gear assembly 140 to be rotated about the first connection protrusion 116 is provided at the center of the first connection protrusion 116. Further, the first connection protrusion 116 may be disposed coaxially with the first connection hole 114 and the rotation shaft 132 of the driving motor 130 passing through the first connection hole 114.

The first support rib 118 protrudes from the inner plane of the side surface 110b, which is connected to the driving motor 130, to the inside of the housing 110 by a designated length, and is connected to one end of the elastic member 170 elastically supporting the gear assembly 140.

The driving wheel 120 includes a wheel part 122 directly contacting the floor surface of the space to be cleaned so as to execute travelling of the main body 10, and a driving shaft 124 connected to the gear assembly 140 under the condition that the driving shaft 124 is fixed to the wheel part 122 to rotate the wheel part 122.

The driving motor 130 is connected to the outer plane of the side surface 110b of the housing 110 provided with the first connection hole 114, and the rotation shaft 132 of the driving motor 130 passes through the first connection hole 114 and is connected to the gear assembly 140 within the housing 110. Driving force of the driving motor 130 is transmitted to the driving shaft 124 through the rotation shaft 132 and power transmission gears 144 connected to the rotation shaft 132, thus rotating the driving wheel 120 and executing traveling.

The gear assembly 140 includes a gear case 142, the power transmission gears 144 engaged with each other and rotatably disposed within the gear case 142, the second connection protrusion 146 connecting the gear assembly 140 to the housing 110, and a second support protrusion 148 connected to one end of the elastic member 170.

The gear case 142 rotatably supports the power transmission gears 144 disposed therein.

The power transmission gears 144 are rotatably supported by the gear case 142 under the condition that they are engaged with each other, and connect the rotation shaft 132 of the driving motor 130 and the driving shaft 124 of the driving wheel 120 to transmit driving force of the driving motor 130 to the driving shaft 124. The rotation shaft 132 may pass through a second connection hole 141 formed on one side surface 142b of the gear case 142 and be connected to one of the power transmission gears 144, and the driving shaft 124 may pass through a third connection hole 147 formed on the other side surface 142a of the gear case 142 and be connected to one of the remaining power transmission gears 144 which are not connected to the rotation shaft 132.

The second connection protrusion 146 protrudes from the side surface 142a of the gear case 142 in a direction towards the first connection protrusion 116 by a designated length, and is rotatably connected to the accommodation hole 116a formed on the first connection protrusion 116.

The second support protrusion 148 protrudes from the upper portion of the gear case 142 in a direction towards the first support protrusion 118 and is connected to the other end of the elastic member 170 elastically supporting the gear assembly 140.

The gear assembly 140 is rotatably connected to the housing 110 through the second connection protrusion 146, and is elastically supported by the housing 110 by the second support protrusion 148 and the elastic member 170.

The sensing unit 150 detecting displacement of the driving wheel 120 includes a sensed body 152 provided on the gear assembly 140, a guide slot 154 accommodating the sensed body 152, and a sensor 156 installed in the guide slot 154 and sensing the sensed body 152.

The sensed body 152 protrudes from the side surface 142b of the gear case 142 in a direction towards the side surface 110b of the housing 110, and is movably accommodated in the guide slot 154.

The guide slot 154 is provided on the side surface 110b of the housing 110, accommodates the sensed body 152, and forms a movement path guiding movement of the sensed body 152.

The sensor 156 senses a separation distance with the sensed body 152 moving along the guide slot 154 through pattern change of received light according to the separation distance with the sensed body 152, and converts the sensed separation distance with the sensed body 152 into a standardized parameter, such as voltage, to detect displacement of the driving wheel 120.

Figure 5A:
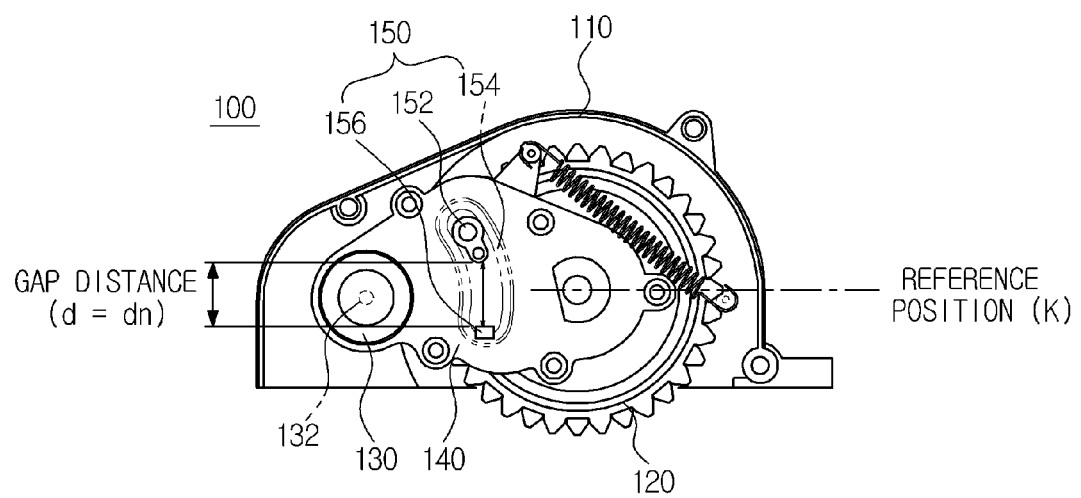
FIGS. 5A to 5C are views illustrating the change of a separation distance between the sensor and the sensed body, according to the positive or negative displacement of a driving wheel.
Figure 5B:
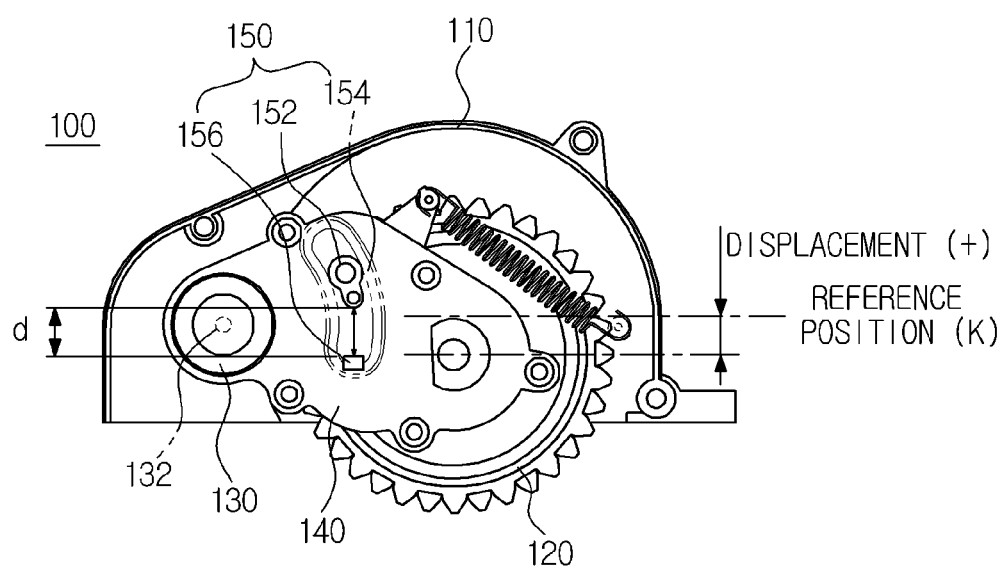
Figure 5C:
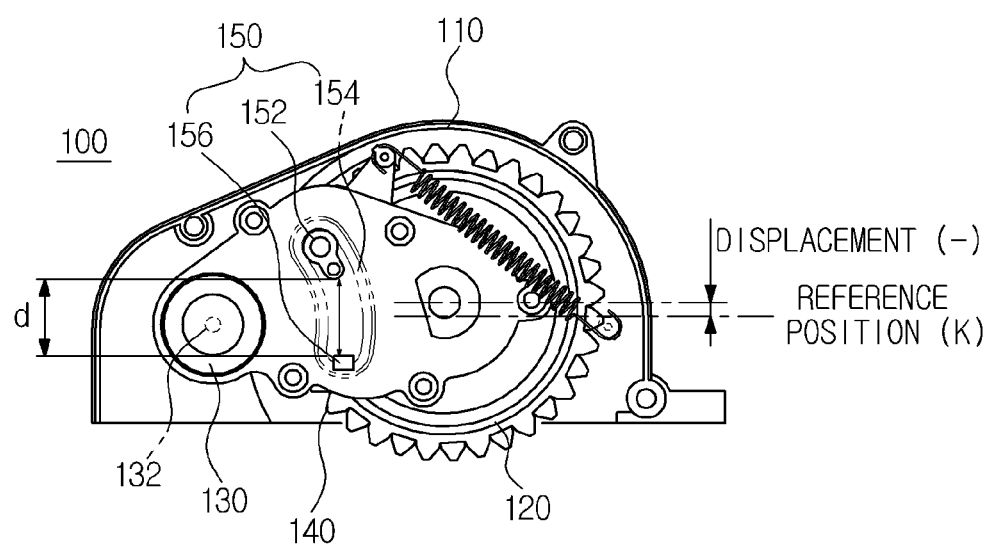
Figure 6:
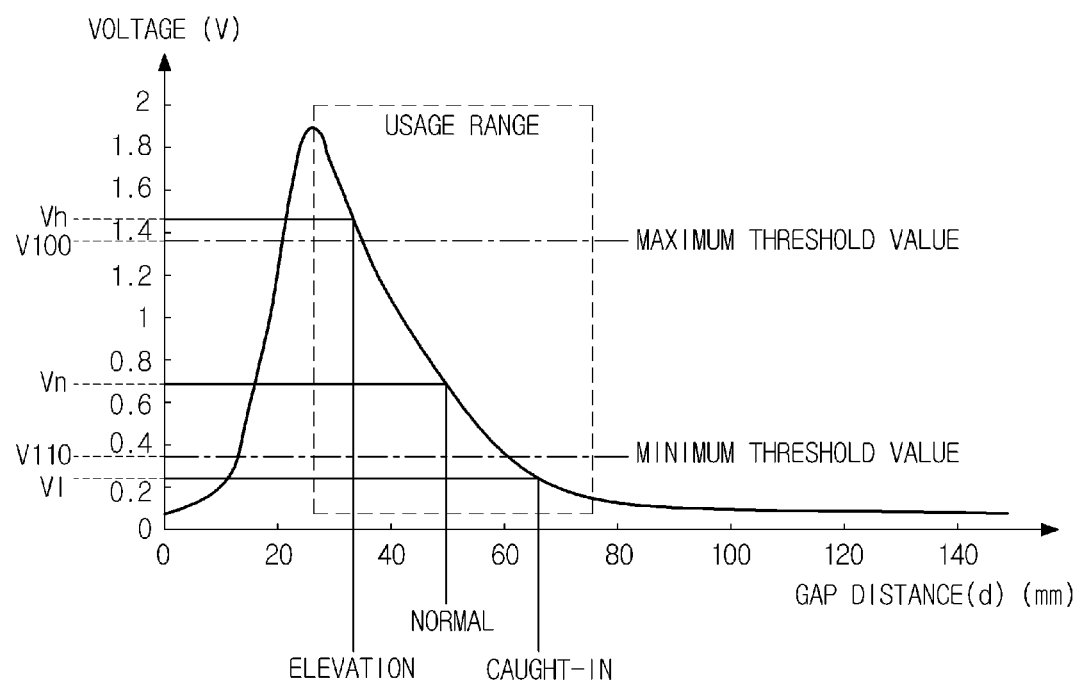
FIG. 6 is a graph illustrating the relationship of the separation distance between the sensor and the sensed body and the voltage generated from the sensor.
Figure 7:
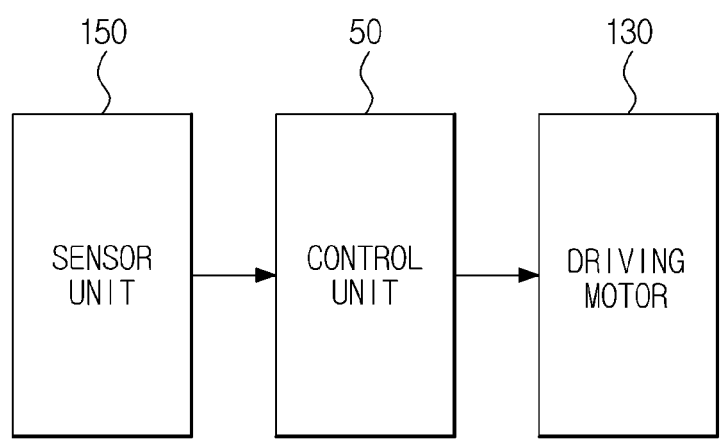
FIG. 7 is a control block diagram of a sensing unit and a driving motor, according to an example embodiment.

FIGS. 5A to 5C are views illustrating change of the separation distance between the sensor 156 and the sensed body 152 according to displacement of the driving wheel. FIG. 6 is a graph illustrating a relationship of the separation distance between the sensor and the sensed body and the voltage generated from the sensor. FIG. 7 is a control block diagram of the sensing unit 150 and the driving motor 130.

First, a reference position K, as shown in FIG. 5A for example, is defined as a position where the center of rotation of the driving wheel 120 when the main body 10 of the robot cleaner 1 executes a cleaning operation while travelling on a hard floor (hereinafter, referred to as a 'H/F'), such as a floor. The separation distance d between the sensor 156 and the sensed body 152 at this time is referred to as a reference separation distance dn. Further, the driving wheel 120 is defined as having positive (+) displacement if the center of rotation of the driving wheel 120 is located at a lower position than the reference position K, and is defined as having negative (−) displacement if the center of rotation of the driving wheel 120 is located at a higher position than the reference position K.

As shown in FIG. 5A, when the main body 10 travels in the H/F region without encountering any obstacles, the distance d between the sensor 156 and the sensed body 152d becomes the reference separation distance dn, and thus, a displacement of the driving wheel 120 according to the reference separation distance dn becomes 0.

As shown in FIG. 5B, when the main body 10 meets an inclined surface or a climbing obstacle B1 and climbs the inclined surface of the climbing obstacle B1 (with reference to FIGS. 20A to 20D), the gear assembly 140 is rotated in the clockwise direction about the rotation shaft 132 of the driving motor 130 and the second connection protrusion 146 disposed coaxially with the rotation shaft 132. The sensed body 152 moving together with the gear assembly 140 is also rotated in the clockwise direction. That is, the separation distance d between the sensor 156 and the sensed body 152 in the lifted state becomes smaller than the reference separation distance dn.

As shown in FIG. 5C, when the main body 10 meets and is jammed into a jamming obstacle B2, such as a side table (with reference to FIGS. 22A to 22D), the gear assembly 140 is rotated in the counterclockwise direction about the rotation shaft 132 of the driving motor 130 and the second connection protrusion 146 disposed coaxially with the rotation shaft 132. The sensed body 152 moving together with the gear assembly 140 is also rotated in the counterclockwise direction. That is, the separation distance d between the sensor 156 and the sensed body 152 in the jammed state becomes greater than the reference separation distance dn, which corresponds to the reference position K.

FIG. 6 is a graph illustrating a reference to detect displacement of the driving wheel 120 by converting the separation distance d between the sensed body 152 sensed and the sensor 156 into a standardized parameter, such as voltage. Here, the horizontal axis represents the separation distance d between the sensor 156 and the sensed body 152, and the vertical axis represents voltage corresponding to the separation distance d between the sensor 156 and the sensed body 152.

As shown in FIG. 6, if the separation distance d between the sensor 156 and the sensed body 152 is equal to the reference separation distance dn, the sensor 156 detects displacement of the driving wheel 120 as '0' by converting the separation distance d into reference voltage Vn corresponding to the reference separation distance dn.

If the separation distance d between the sensor 156 and the sensed body 152 is smaller than the reference separation distance dn (with reference to FIG. 5B), the sensor 156 detects displacement of the driving wheel 120 as having a positive (+) value by converting the separation distance d into voltage higher than the reference voltage Vn.

If the separation distance d between the sensor 156 and the sensed body 152 is greater than the reference separation distance dn, the sensor 156 detects displacement of the driving wheel 120 as having a negative (−) value by converting the separation distance d into voltage lower than the reference voltage Vn.

That is, in a usage range R of the sensor 156, the separation distance d between the sensor 156 and the sensed body 152 is in inverse proportion to voltage, and voltage is in direct proportion to displacement of the driving wheel 120.

Such displacement of the driving wheel 120 detected by the sensor 156 is transmitted to a controller 50, as shown in FIG. 7, and the controller 50 compares the transmitted displacement of the driving wheel 120 with a predetermined reference range.

The controller 50 controls the driving motor 130 so as to maintain the travelling path of the main body 10 upon judging that the transmitted displacement of the driving wheel 120 is within the predetermined reference range, and controls the driving motor 130 so as to change the travelling path of the main body 10 upon judging that the transmitted displacement of the driving wheel 120 deviates from the predetermined reference range.

For example, if the driving wheel 120 is excessively lifted while the main body 10 meets an inclined surface or climbing obstacle B1 and climbs the inclined surface or climbing obstacle B1, the voltage corresponding to the displacement of the driving wheel 120 detected by the sensor 156 may exceed the upper threshold value V100 of the predetermined reference range. As another example, if the main body 10 is jammed into the jamming obstacle B2 while the main body 10 meets the jamming obstacle B2, the voltage corresponding to the displacement of the driving wheel 120 detected by the sensor 156 may not reach the lower threshold value V110 of the predetermined reference range. Thus, when either excessive lifting or jamming occurs, the controller 50 controls the number of rotations or the rotating direction of the driving motor 130 to change the travelling path of the main body 10.

The upper threshold value V100 and the lower threshold value V110 of the reference range may be predetermined in consideration of voltage detected by the sensor 156 in a state in which the driving wheel 120 is lifted and the main body 10 does not travel any more (hereinafter, referred to as 'the lifted state') or in a state in which the main body 10 is jammed and does not travel any more (hereinafter, referred to as 'the jammed state'). That is, the upper threshold value V100 is set to a value slightly lower than voltage Vh detected by the sensor 156 in the lifted state of the main body 10, and the lower threshold value V110 is set to a value slightly higher than voltage Vl detected by the sensor 155 in the jammed state of the main body 10.

A sensing unit 150 detecting the driving wheel 120 and a sensing method thereof may be implemented by various methods differing from the sensing unit 150 and the sensing method of each of the driving wheel assemblies 100a and 100b in accordance with an example embodiment.

Hereinafter, sensing units 250, 350, 450, 550 and 650 in accordance with various modified embodiments will be described. For convenience, a description of parts of the sensing units 250, 350, 450, 550 and 650 in accordance with these example embodiments which are the same as those of the sensing unit 150 of each of the driving wheel assemblies 100a and 100b according to the former example embodiment will be omitted, and the sensing units 250, 350, 450, 550 and 650 in accordance with these example embodiments are respectively independent from each other or are independent from the sensing unit 150 in accordance with the former embodiment.

Figure 8A:
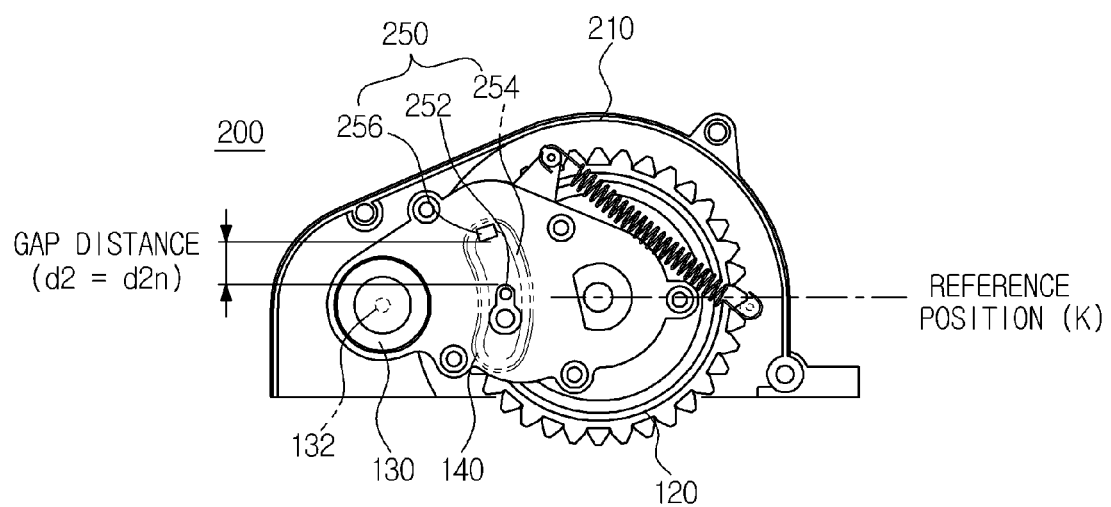
FIGS. 8A to 8C are views illustrating the change of a separation distance between a sensor and a sensed body, according to the displacement of a driving wheel in a driving wheel assembly in accordance with another example embodiment.
Figure 8B:
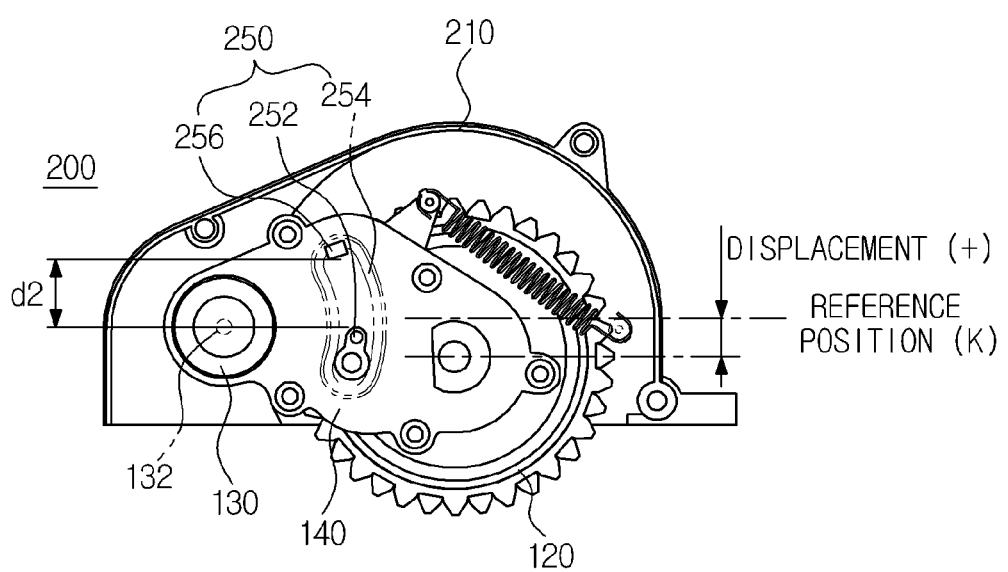
Figure 8C:
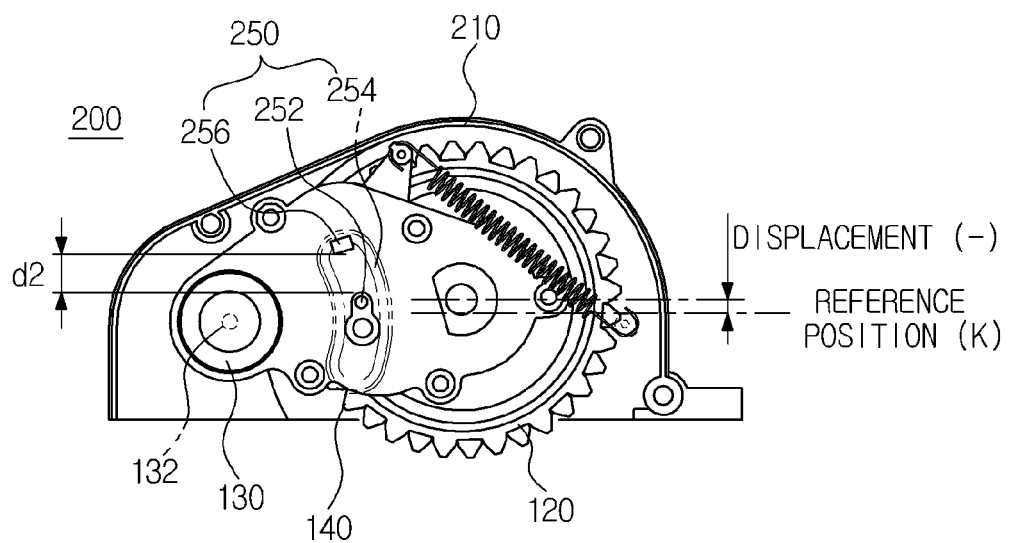
Figure 9:
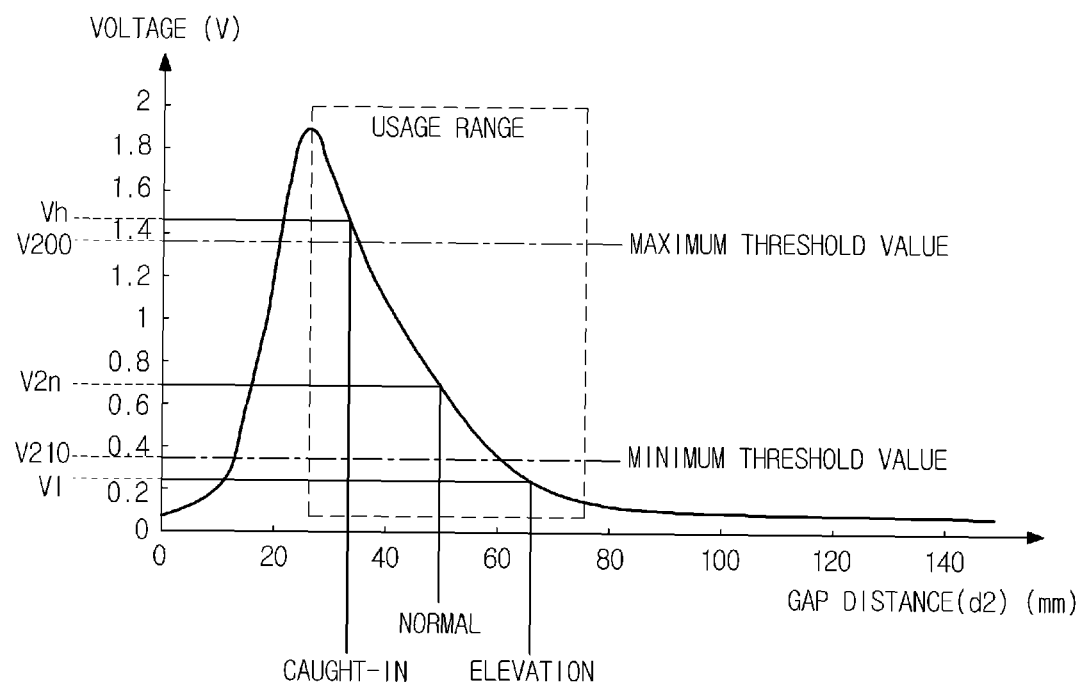
FIG. 9 is a graph illustrating the relationship of the separation distance between the sensor and the sensed body and the voltage generated from the sensor in the driving wheel assembly in accordance with an example embodiment.

FIGS. 8A to 8C are views illustrating change of a separation distance between a sensor and a sensed body according to displacement of a driving wheel in a driving wheel assembly in accordance with another example embodiment. FIG. 9 is a graph illustrating a relationship of the separation distance between the sensor and the sensed body and the voltage generated from the sensor in the driving wheel assembly in accordance with the example embodiment.

As shown in FIGS. 8A to 8C, a sensing unit 250 provided on a driving wheel assembly 200 in accordance with this example embodiment to detect displacement of the driving wheel 120 includes a sensed body 252 provided on the gear assembly 140, a guide slot 254 accommodating the sensed body 252, and a sensor 256 installed in the guide slot 254 and sensing the sensed body 252. FIGS. 8A-8C show the sensor 256 on the upper portion of the guide slot 254.

The sensed body 252 is movably accommodated in the guide slot 254 below the sensor 256.

The guide slot 254 is provided on one side surface of a housing 210, accommodates the sensed body 252, and forms a movement path guiding movement of the sensed body 252.

The sensor 256 is installed at the upper portion of the guide slot 254, senses a separation distance with the sensed body 252 moving along the guide slot 254 through pattern change of received light according to the separation distance with the sensed body 252, and converts the sensed separation distance with the sensed body 252 into a standardized parameter, such as voltage, to detect displacement of the driving wheel 120.

As shown in FIG. 8A, when the main body 10 travels in the H/F region without encountering any obstacle, the distance d2 between the sensor 256 and the sensed body 252 becomes a reference separation distance d2n and displacement of the driving wheel 120 according to the reference separation distance d2n becomes 0.

As shown in FIG. 8B, when the main body 10 meets an inclined surface or a climbing obstacle B1 and climbs the inclined surface or the climbing obstacle B1 (with reference to FIGS. 20A to 20D), the gear assembly 140 is rotated in the clockwise direction about the rotation shaft 132 of the driving motor 130, and the sensed body 252 moving together with the gear assembly 140 is also rotated in the clockwise direction. That is, the separation distance d2 between the sensor 256 and the sensed body 252 in the lifted state becomes greater than the reference separation distance d2n.

As shown in FIG. 8C, when the main body 10 meets and is jammed into a jamming obstacle B2, such as a side table (with reference to FIGS. 22A to 22D), the gear assembly 140 is rotated in the counterclockwise direction about the rotation shaft 132 of the driving motor 130, and the sensed body 252 moving together with the gear assembly 140 is also rotated in the counterclockwise direction. That is, the separation distance d2 between the sensor 256 and the sensed body 252 in the jammed state becomes smaller than the reference separation distance d2n.

FIG. 9 is a graph illustrating a reference to detect displacement of the driving wheel 120 by converting the separation distance d2 with the sensed body 252 sensed by the sensor 256 into a standardized parameter, such as voltage. Here, the horizontal axis represents the separation distance d2 between the sensor 256 and the sensed body 252, and the vertical axis represents voltage corresponding to the separation distance d2 between the sensor 256 and the sensed body 252.

As shown in FIG. 9, if the separation distance d2 between the sensor 256 and the sensed body 252 is equal to the reference separation distance d2n, the sensor 256 detects displacement of the driving wheel 120 as '0' by converting the separation distance d2 into reference voltage V2n corresponding to the reference separation distance d2n.

If the separation distance d2 between the sensor 256 and the sensed body 252 is greater than the reference separation distance d2n, the sensor 256 detects displacement of the driving wheel 120 as having a positive (+) value by converting the separation distance d2 into voltage lower than the reference voltage V2n corresponding to the reference separation distance d2n. If voltage corresponding to the displacement of the driving wheel 120 detected by the sensor 256 does not reach a lower threshold value V210 of a predetermined reference range, the controller 50 judges that the main body 10 is in the lifted state and controls the number of rotations or the rotating direction of the driving motor 130 to change the travelling path of the main body 10.

If the separation distance d2 between the sensor 256 and the sensed body 252 is smaller than the reference separation distance d2n, the sensor 256 detects displacement of the driving wheel 120 as having a negative (−) value by converting the separation distance d2 into voltage higher than the reference voltage V2n corresponding to the reference separation distance d2n. If voltage corresponding to the displacement of the driving wheel 120 detected by the sensor 256 exceeds an upper threshold value V200 of the predetermined reference range, the controller 50 judges that the main body 10 is in the jammed state and controls the number of rotations or the rotating direction of the driving motor 130 to change the travelling path of the main body 10.

That is, in a usage range R2 of the sensor 256, as shown in FIG. 9, the separation distance d2 between the sensor 256 and the sensed body 252 is in inverse proportion to voltage, and voltage is in inverse proportion to displacement of the driving wheel 120.

Figure 10A:
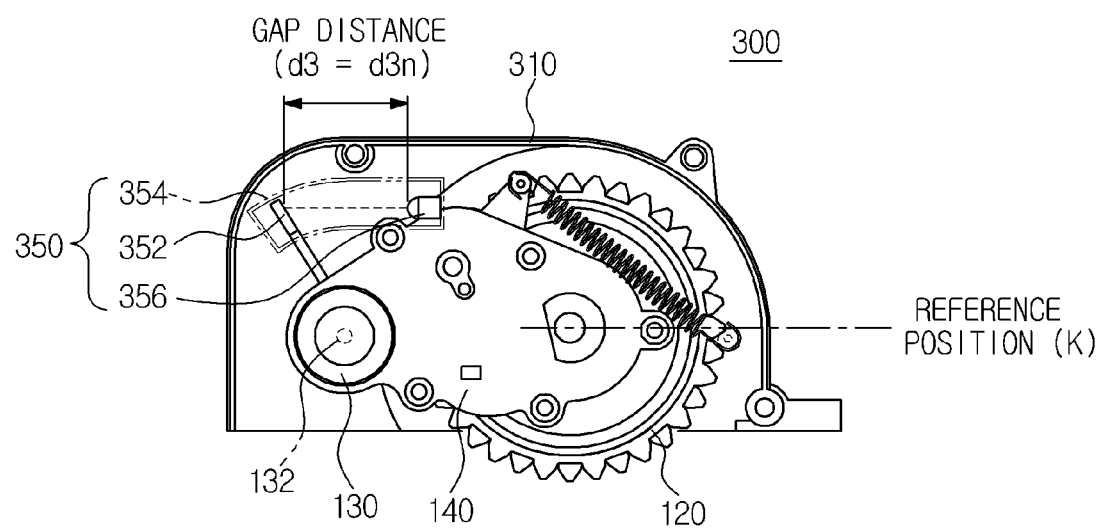
FIGS. 10A to 10C are views illustrating the change of a separation distance between a sensor and a sensed body, according to the displacement a driving wheel in a driving wheel assembly in accordance with another example embodiment.
Figure 10B:
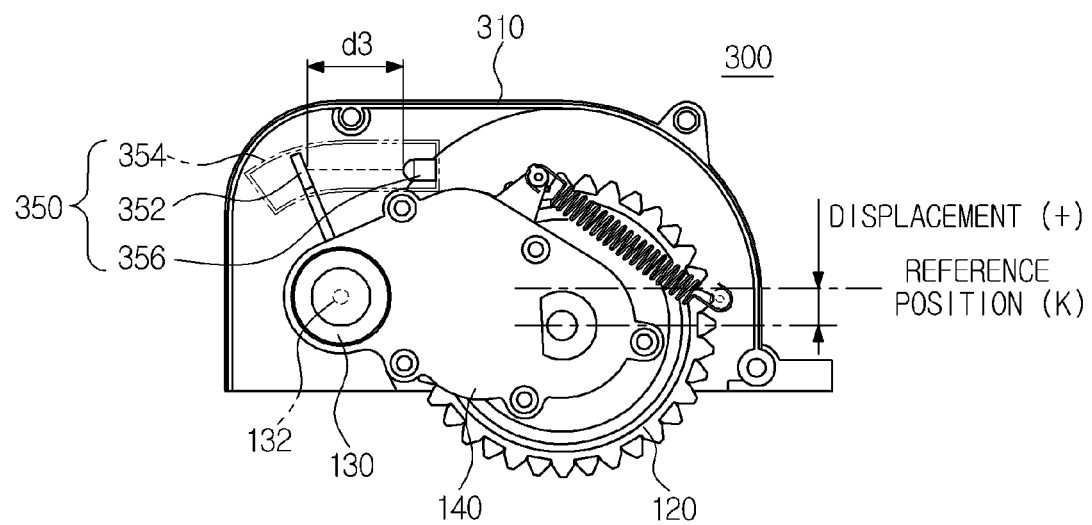
Figure 10C:
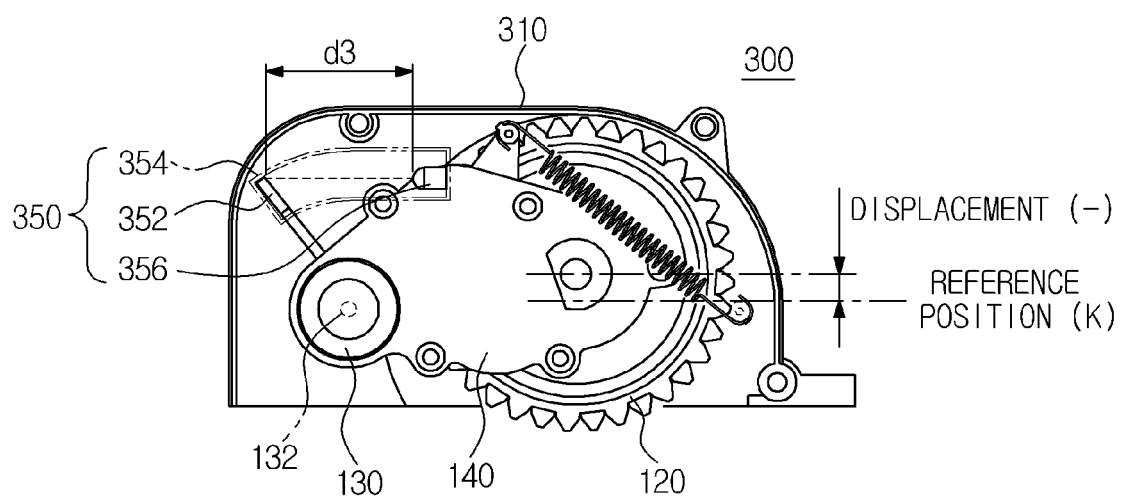
Figure 11:
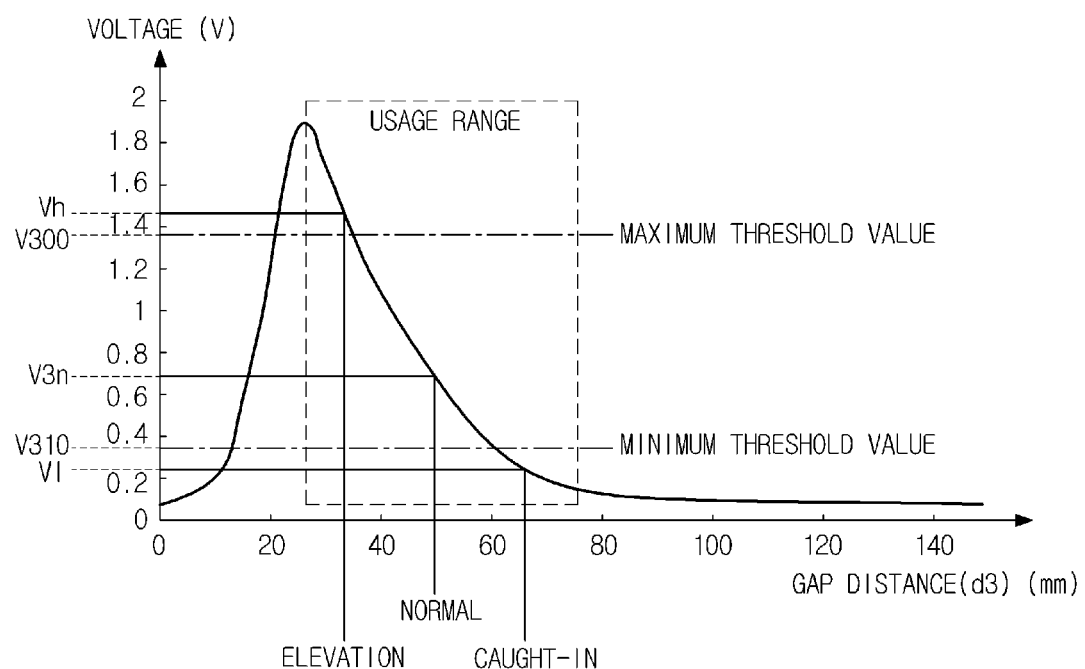
FIG. 11 is a graph illustrating the relationship of the separation distance between the sensor and the sensed body and the voltage generated from the sensor in the driving wheel assembly in accordance with an example embodiment.

FIGS. 10A to 10C are views illustrating the change of a separation distance between a sensor 356 and a sensed body 352 according to displacement a driving wheel in a driving wheel assembly in accordance with another example embodiment. FIG. 11 is a graph illustrating a relationship of the separation distance between the sensor and the sensed body and voltage generated from the sensor in the driving wheel assembly in accordance with this example embodiment.

As shown in FIGS. 10A to 10C, a sensing unit 350 provided on a driving wheel assembly 300 in accordance with this example embodiment to detect displacement of the driving wheel 120 includes a sensed body 352 provided on the gear assembly 140, a guide slot 354 accommodating the sensed body 352, and a sensor 356 installed in the guide slot 354 and sensing the sensed body 352.

The sensed body 352 is provided in a bar type extending approximately upwardly from the upper portion of the gear assembly 140, and is movably accommodated in the guide slot 354.

The guide slot 354 is provided on one side surface of a housing 310, accommodates the sensed body 352, and forms a movement path to guide movement of the sensed body 352.

The sensor 356, which is installed at the upper portion of the guide slot 354, senses a separation distance with the sensed body 352 moving along the guide slot 354 through pattern change of received light according to the separation distance with the sensed body 352, and converts the sensed separation distance with the sensed body 352 into a standardized parameter, such as voltage, to detect displacement of the driving wheel 120.

As shown in FIG. 10A, when the main body 10 travels in the H/F region without encountering any obstacle, the distance d3 between the sensor 356 and the sensed body 352 becomes a reference separation distance d3$n$ and displacement of the driving wheel 120 according to the reference separation distance d3$n$ becomes 0.

As shown in FIG. 10B, when the main body 10 meets an inclined surface or a climbing obstacle B1 and climbs the inclined surface or the climbing obstacle B1 (with reference to FIGS. 20A to 20D), the gear assembly 140 is rotated in the clockwise direction about the rotation shaft 132 of the driving motor 130, and the sensed body 352 moving together with the gear assembly 140 is also rotated in the clockwise direction. That is, the separation distance d3 between the sensor 356 and the sensed body 352 in the lifted state becomes smaller than the reference separation distance d3$n$.

As shown in FIG. 10C, when the main body 10 meets and is jammed into a jamming obstacle B2, such as a side table (with reference to FIGS. 22A to 22D), the gear assembly 140 is rotated in the counterclockwise direction about the rotation shaft 132 of the driving motor 130, and the sensed body 352 moving together with the gear assembly 140 is also rotated in the counterclockwise direction. That is, the separation distance d3 between the sensor 356 and the sensed body 352 in the jammed state becomes greater than the reference separation distance d3$n$.

FIG. 11 is a graph illustrating a reference to detect displacement of the driving wheel 120 by converting the separation distance d3 with the sensed body 352 sensed by the sensor 356 into a standardized parameter, such as voltage.

Here, the horizontal axis represents the separation distance d3 between the sensor 356 and the sensed body 352, and the vertical axis represents voltage corresponding to the separation distance d3 between the sensor 356 and the sensed body 352.

As shown in FIG. 11, if the separation distance d3 between the sensor 356 and the sensed body 352 is equal to the reference separation distance d3$n$, the sensor 356 detects displacement of the driving wheel 120 as '0' by converting the separation distance d3 into reference voltage V3$n$ corresponding to the reference separation distance d3$n$.

If the separation distance d3 between the sensor 356 and the sensed body 352 is smaller than the reference separation distance d3$n$, the sensor 356 detects displacement of the driving wheel 120 as having a positive (+) value by converting the separation distance d3 into voltage higher than the reference voltage V3$n$ corresponding to the reference separation distance d3$n$. If voltage corresponding to the displacement of the driving wheel 120 detected by the sensor 356 exceeds an upper threshold value V300 of a predetermined reference range, the controller 50 judges that the main body 10 is in the lifted state and controls the number of rotation or the rotating direction of the driving motor 130 to change the travelling path of the main body 10.

If the separation distance d3 between the sensor 356 and the sensed body 352 is greater than the reference separation distance d3$n$, the sensor 356 detects displacement of the driving wheel 120 as having a negative (−) value by converting the separation distance d3 into voltage lower than the reference voltage V3$n$ corresponding to the reference separation distance d3$n$. If voltage corresponding to the displacement of the driving wheel 120 detected by the sensor 356 does not reach a lower threshold value V310 of the predetermined reference range, the controller 50 judges that the main body 10 is in the jammed state and controls the number of rotation or the rotating direction of the driving motor 130 to change the travelling path of the main body 10.

That is, in a usage range R3 of the sensor 356, as shown in FIG. 11, the separation distance d3 between the sensor 356 and the sensed body 352 is in inverse proportion to voltage, and voltage is in direct proportion to displacement of the driving wheel 120.

Figure 12A:
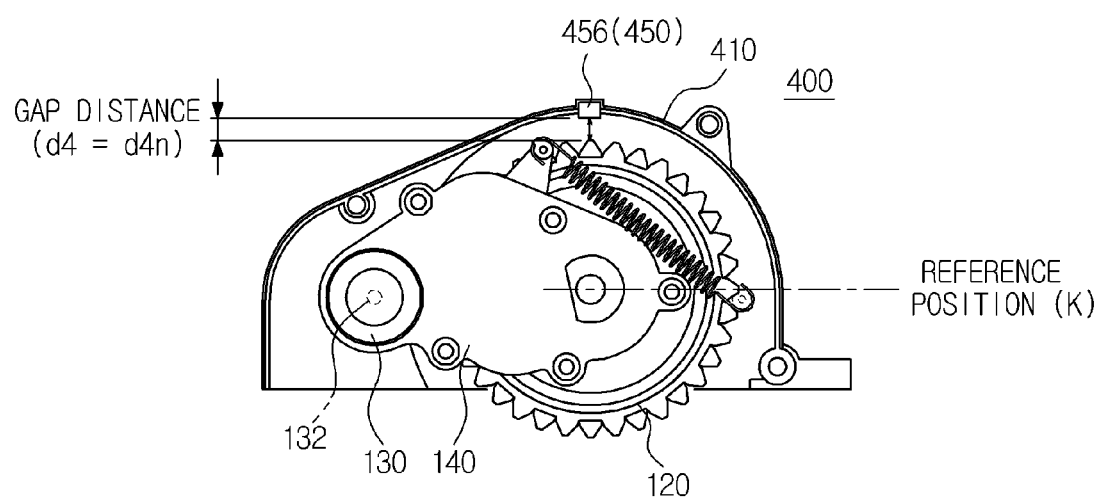
FIGS. 12A to 12C are views illustrating the change of a separation distance between a sensor and a sensed body, according to the displacement of a driving wheel in a driving wheel assembly in accordance with another example embodiment.
Figure 12B:
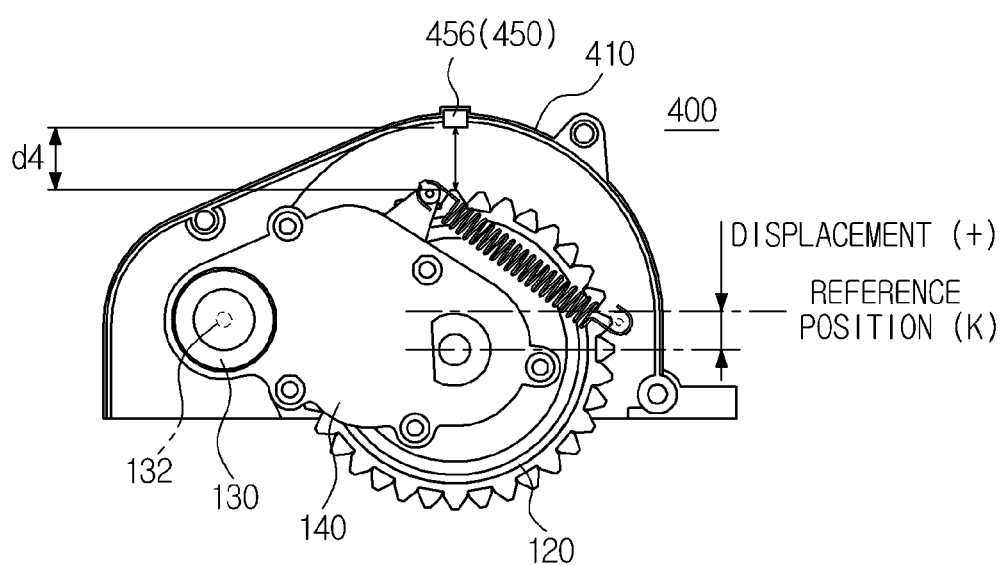
Figure 12C:
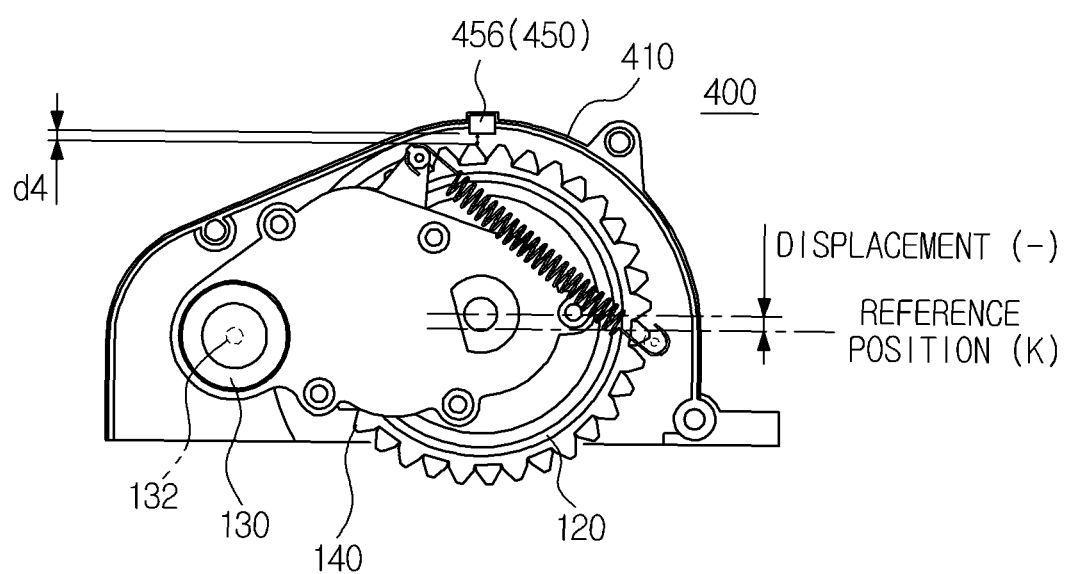
Figure 13:
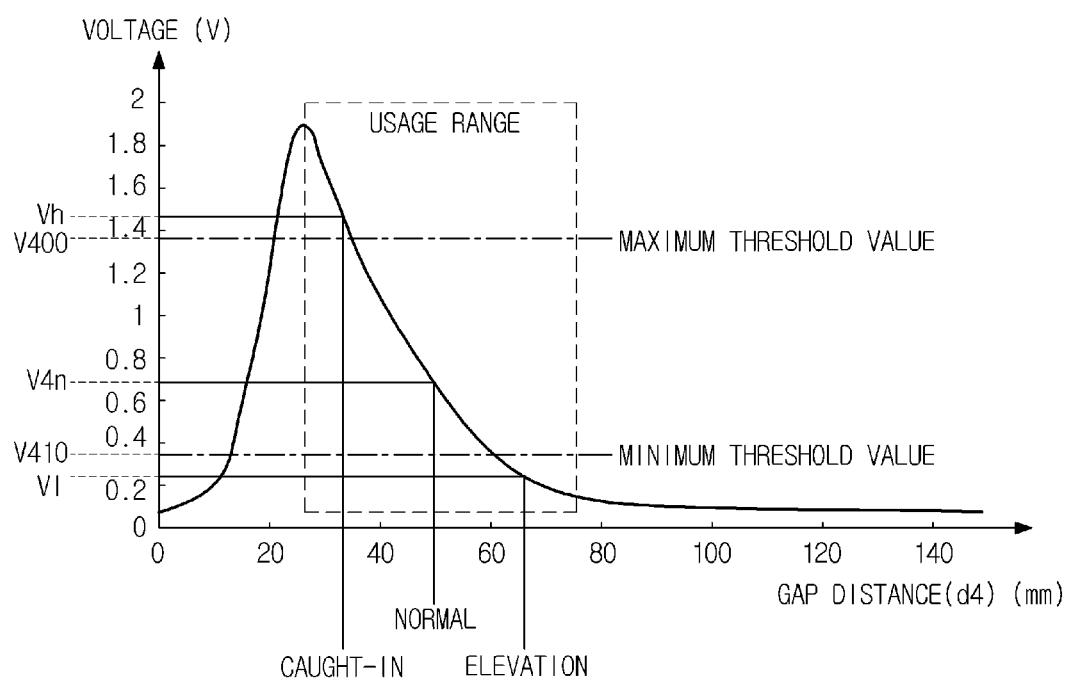
FIG. 13 is a graph illustrating the relationship of the separation distance between the sensor and the sensed body and voltage generated from the sensor in the driving wheel assembly in accordance with an example embodiment.

FIGS. 12A to 12C are views illustrating change of a separation distance between a sensor and a sensed body according to displacement of a driving wheel in a driving wheel assembly in accordance with another example embodiment. FIG. 13 is a graph illustrating a relationship of the separation distance between the sensor and the sensed body and voltage generated from the sensor in the driving wheel assembly in accordance with the example embodiment.

As shown in FIGS. 12A to 12C, a sensing unit 450 provided on a driving wheel assembly 400 in accordance with this example embodiment to detect displacement of the driving wheel 120 includes a sensor 456 sensing movement of the driving wheel 120.

The sensor 456 is installed at the inside or the outside of a housing 410 located above the driving wheel 120, senses a separation distance with the driving wheel 120 moving together with the gear assembly 140 through pattern change of received light according to the separation distance with the driving wheel 120, and converts the sensed separation distance with the driving wheel 120 into a standardized parameter, such as voltage, to detect displacement of the driving wheel 120.

As shown in FIG. 12A, when the main body 10 travels in the H/F region without encountering any obstacle, the distance d4 between the sensor 456 and the driving wheel 120 becomes a reference separation distance d4n and displacement of the driving wheel 120 according to the reference separation distance d4n becomes 0.

As shown in FIG. 12B, when the main body 10 meets an inclined surface or a climbing obstacle B1 and climbs the inclined surface or the climbing obstacle B1 (with reference to FIGS. 20A to 20D), the gear assembly 140 is rotated in the clockwise direction about the rotation shaft 132 of the driving motor 130, and the driving wheel 120 moving together with the gear assembly 140 is also rotated in the clockwise direction. That is, the separation distance d4 between the sensor 456 and the driving wheel 120 in the lifted state becomes greater than the reference separation distance d4n.

As shown in FIG. 12C, when the main body 10 meets and is jammed into a jamming obstacle B2, such as a side table (with reference to FIGS. 22A to 22D), the gear assembly 140 is rotated in the counterclockwise direction about the rotation shaft 132 of the driving motor 130, due to the jamming of the main body. The driving wheel 120 moving together with the gear assembly 140 is also rotated in the counterclockwise direction, due to the jamming. As a result, the separation distance d4 between the sensor 456 and the driving wheel 120 in the jammed state becomes smaller than the reference separation distance d4n.

FIG. 13 is a graph illustrating a reference to detect displacement of the driving wheel 120 by converting the separation distance d4 with the driving wheel 120 sensed by the sensor 456 into a standardized parameter, such as voltage. Here, the horizontal axis represents the separation distance d4 between the sensor 456 and the driving wheel 120, and the vertical axis represents voltage corresponding to the separation distance d4 between the sensor 456 and the driving wheel 120.

As shown in FIG. 13, if the separation distance d4 between the sensor 456 and the driving wheel 120 is equal to the reference separation distance d4n, the sensor 456 detects displacement of the driving wheel 120 as '0' by converting the separation distance d4 into reference voltage V4n corresponding to the reference separation distance d4n.

If the separation distance d4 between the sensor 456 and the driving wheel 120 is greater than the reference separation distance d4n, the sensor 456 detects displacement of the driving wheel 120 as having a positive (+) value by converting the separation distance d4 into voltage lower than the reference voltage V4n corresponding to the reference separation distance d4n. If voltage corresponding to the displacement of the driving wheel 120 detected by the sensor 456 does not reach a lower threshold value V410 of a predetermined reference range, the controller 50 judges that the main body 10 is in the lifted state and controls the number of rotations or the rotating direction of the driving motor 130 to change the travelling path of the main body 10.

If the separation distance d4 between the sensor 456 and the driving wheel 120 is smaller than the reference separation distance d4n, the sensor 456 detects displacement of the driving wheel 120 as having a negative (−) value by converting the separation distance d4 into a voltage that is higher than the reference voltage V4n corresponding to the reference separation distance d4n. If voltage corresponding to the displacement of the driving wheel 120 detected by the sensor 456 exceeds an upper threshold value V400 of the predetermined reference range, the controller 50 judges that the main body 10 is in the jammed state and controls the number of rotations or the rotating direction of the driving motor 130 to change the travelling path of the main body 10.

That is, in a usage range R4 of the sensor 456, as shown in FIG. 13, the separation distance d4 between the sensor 456 and the driving wheel 120 is in inverse proportion to voltage, and voltage is in inverse proportion to displacement of the driving wheel 120.

Figure 14A:
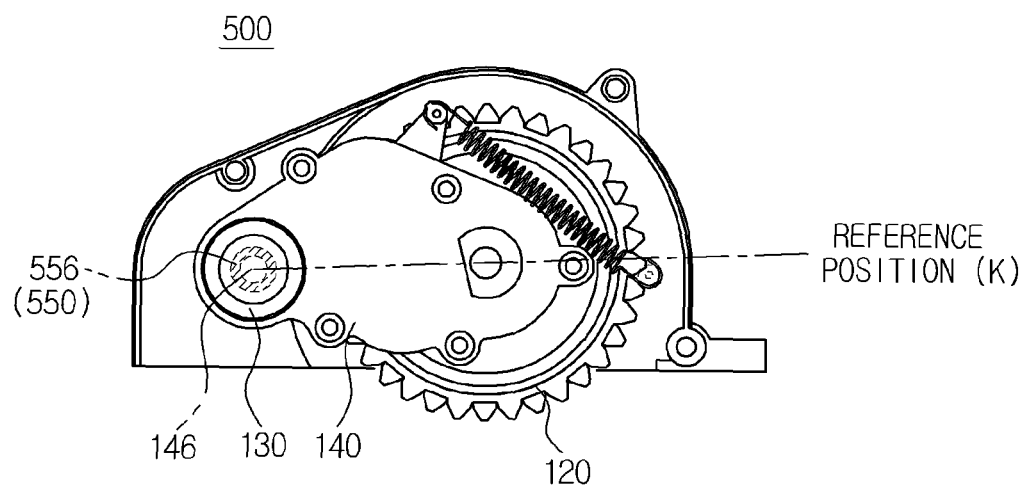
FIGS. 14A to 14C are views illustrating the change of a rotating angle of a driving wheel, according to the displacement of the driving wheel in a driving wheel assembly in accordance with another example embodiment.
Figure 14B:
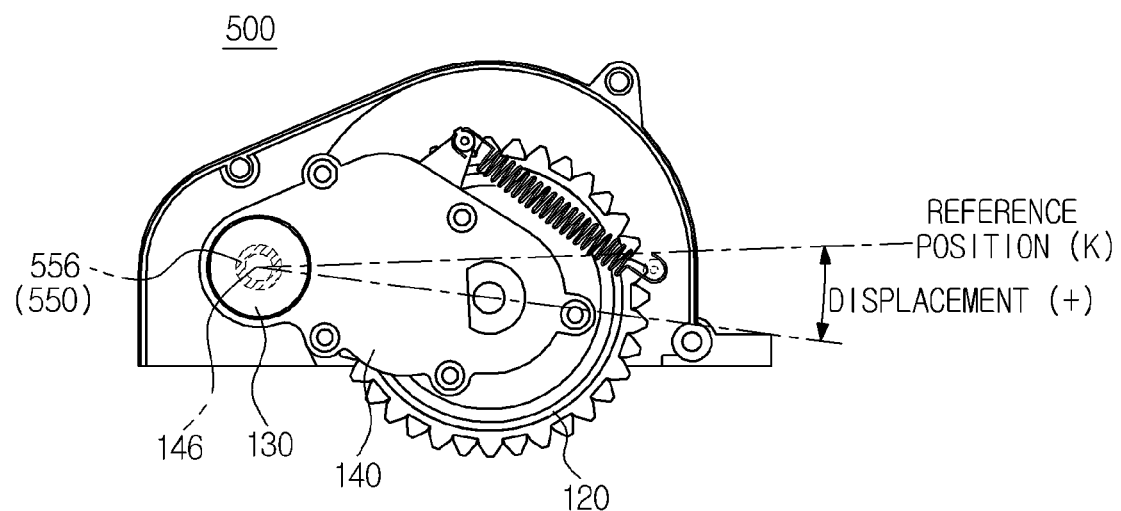
Figure 14C:
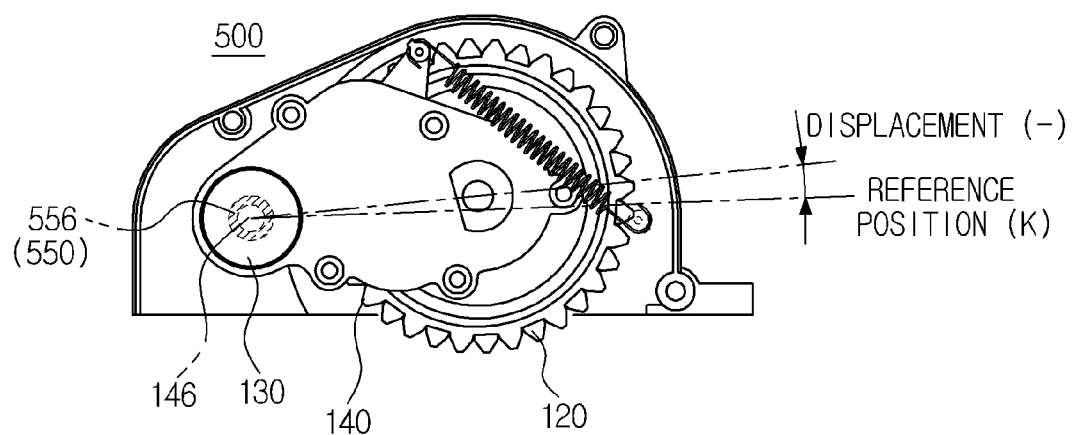

FIGS. 14A to 14C are views illustrating change of a rotating angle of a driving wheel according to displacement of the driving wheel in a driving wheel assembly in accordance with another example embodiment.

As shown in FIGS. 14A to 14C, a sensing unit 550 provided on a driving wheel assembly 500 in accordance with this example embodiment to detect displacement of the driving wheel 120 includes a sensor 556 directly sensing rotation of the gear assembly 140 or the driving wheel 120.

The sensor 556 is installed at the center of rotation of the gear assembly 140 and senses the rotating angle of the gear assembly 140 or the driving wheel 120 rotated together with the gear assembly 140.

As shown in FIG. 14A, when the main body 10 travels on the H/F region without encountering any obstacles, the rotating angle of the gear assembly 140 or the driving wheel 120 sensed by the sensor 556 becomes 0, and thus, displacement of the driving wheel becomes 0.

As shown in FIG. 14B, when the main body 10 meets an inclined surface or a climbing obstacle B1 and climbs the inclined surface or the climbing obstacle B1 (with reference to FIGS. 20A to 20D), the gear assembly 140 is rotated in the clockwise direction about the rotation shaft 132 of the driving motor 130. The driving wheel 120 moving together with the gear assembly 140 is also rotated in the clockwise direction, and the sensor 556 detects displacement of the driving wheel 120 as having a positive (+) value in this state.

If the displacement of the driving wheel 120 detected by the sensor 556 exceeds an upper threshold value of a predetermined reference range, the controller 50 judges that the main body 10 is in the lifted state and controls the number of rotations or the rotating direction of the driving motor 130 to change the travelling path of the main body 10.

As shown in FIG. 14C, when the main body 10 meets and is jammed into a jamming obstacle B2, such as a side table (with reference to FIGS. 22A to 22D), the gear assembly 140 is rotated in the counterclockwise direction about the rotation shaft 132 of the driving motor 130. The driving wheel 120 moving together with the gear assembly 140 is also rotated in the counterclockwise direction, and the sensor 556 detects displacement of the driving wheel 120 as having a negative (−) value in this state.

If the displacement of the driving wheel 120 detected by the sensor 556 does not reach a lower threshold value of the predetermined reference range, the controller 50 judges that the main body 10 is in the jammed state and controls the number of rotations or the rotating direction of the driving motor 130 to change the travelling path of the main body 10.

Figure 15:
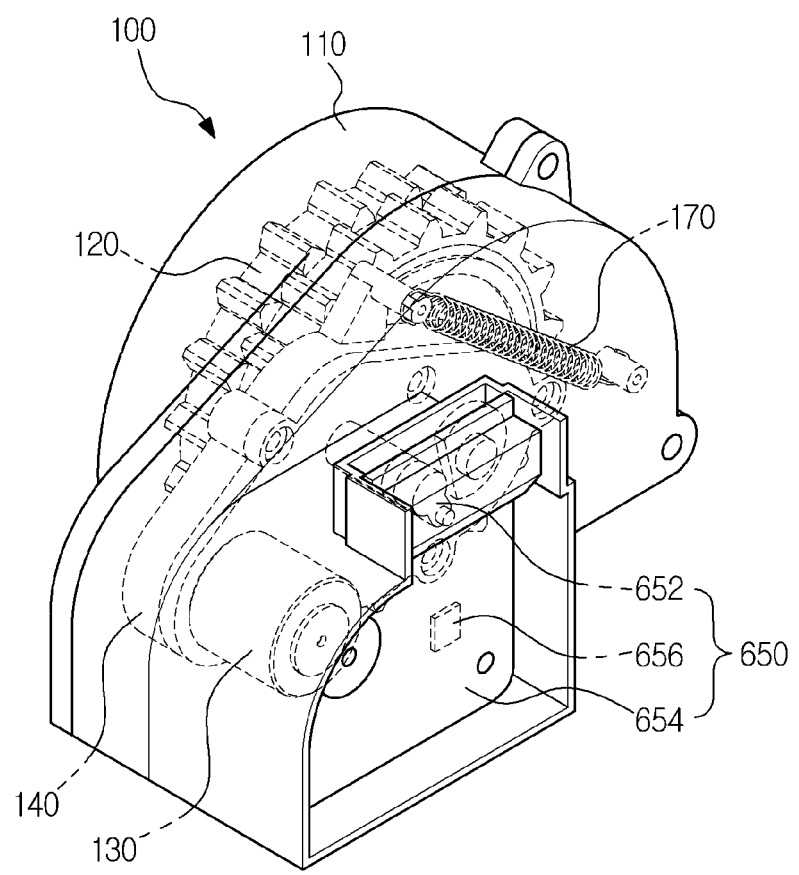
FIG. 15 is a perspective view illustrating a driving wheel assembly in accordance with another example embodiment.
Figure 16:
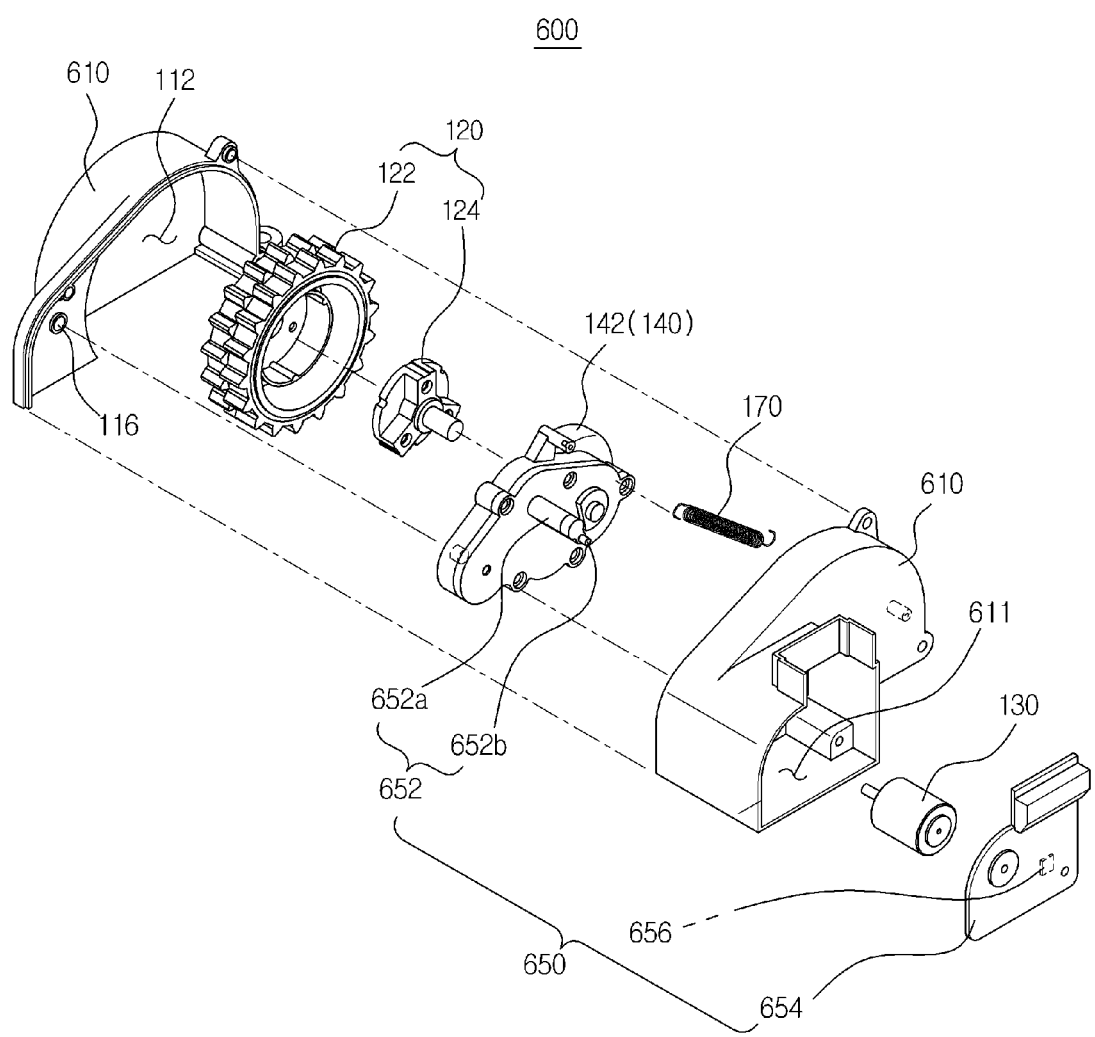
FIG. 16 is an exploded perspective view of the driving wheel assembly, as shown in FIG. 15.
Figure 17:
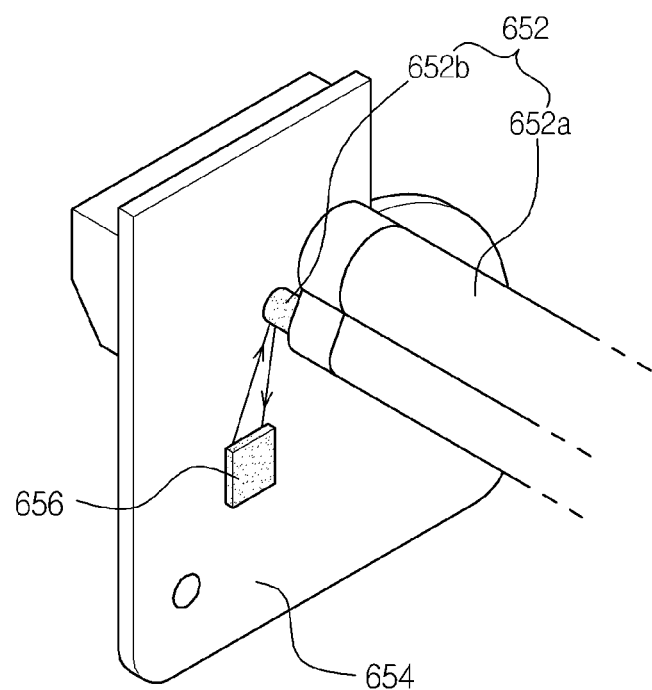
FIG. 17 is a view illustrating a sensor and a sensed body extracted from the driving wheel assembly, as shown in FIG. 15.

FIG. 15 is a perspective view illustrating a driving wheel assembly in accordance with another example embodiment, FIG. 16 is an exploded perspective view of the driving wheel assembly, as shown in FIG. 15, and FIG. 17 is a view illustrating a sensor and a sensed body extracted from the driving wheel assembly, as shown in FIG. 15.

As shown in FIGS. 15 to 17, a sensing unit 650 disposed on a driving wheel assembly 600 in accordance with this example embodiment to detect displacement of the driving wheel 120 includes a sensed body 652 disposed on the gear assembly 140, a sensor 656 sensing the sensed body 652, and a bracket 654 fixing the sensor 656 to a housing 610.

The sensed body 652 includes a protruding rib 652a protruding from the side surface 142b of the gear case 142 in a direction towards one side surface 610b of the housing 610, and a magnet 652b connected to one end of the protruding rib 652a.

A driving motor accommodation part 611 accommodating the driving motor 130 is provided at one side of the housing 610, and the bracket 654 supporting and fixing the sensor 656 is connected to the driving motor accommodation part 611.

The sensor 656, which is fixed to one side of the bracket 654, senses a separation distance with the sensed body 652 through magnetic interaction with the magnet 652b moving together with the gear assembly 140 within the driving motor accommodation part 611, and converts the sensed separation distance with the sensed body 652 into a standardized parameter, such as voltage, to detect the positive or negative displacement of the driving wheel 120.

Figure 18A:
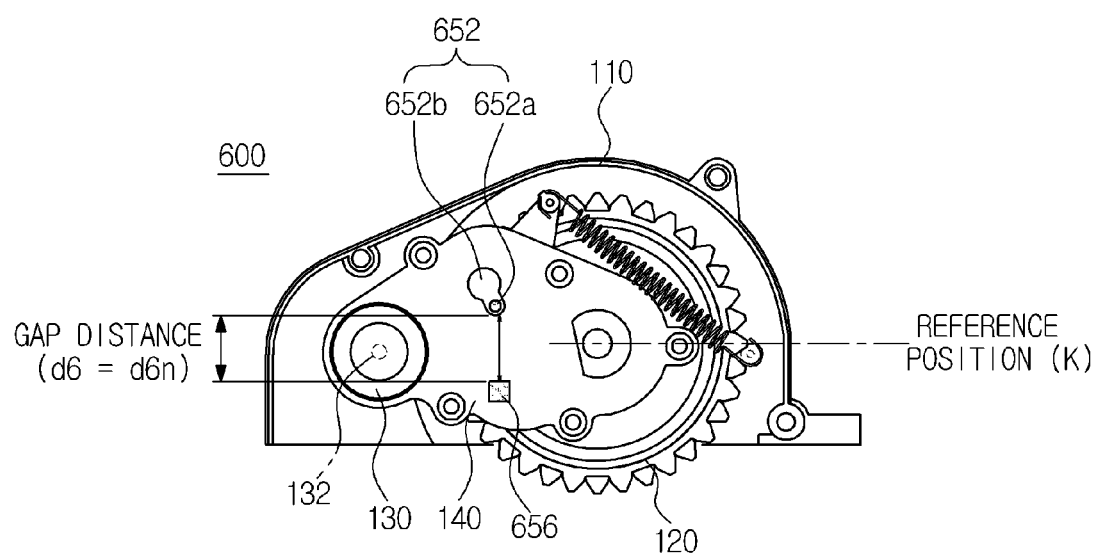
FIGS. 18A to 18C are views illustrating the change of a separation distance between the sensor and the sensed body, according to the displacement of a driving wheel in accordance with an example embodiment.
Figure 18B:
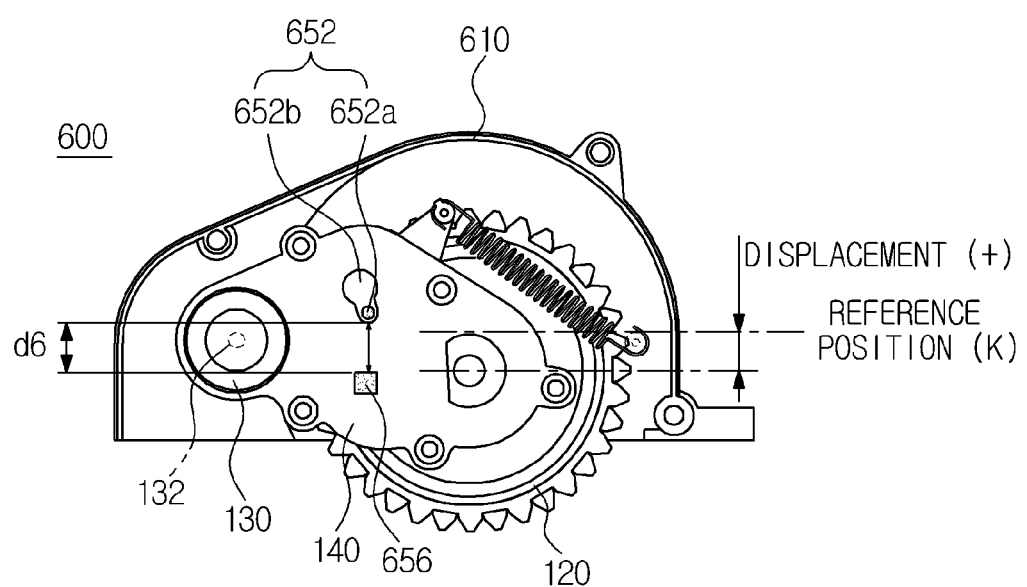
Figure 18C:
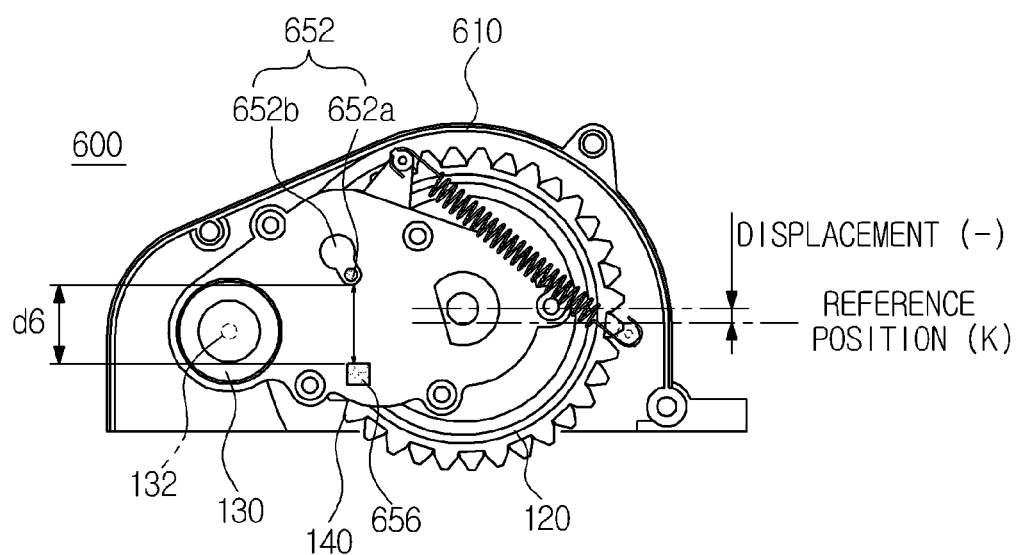
Figure 19:
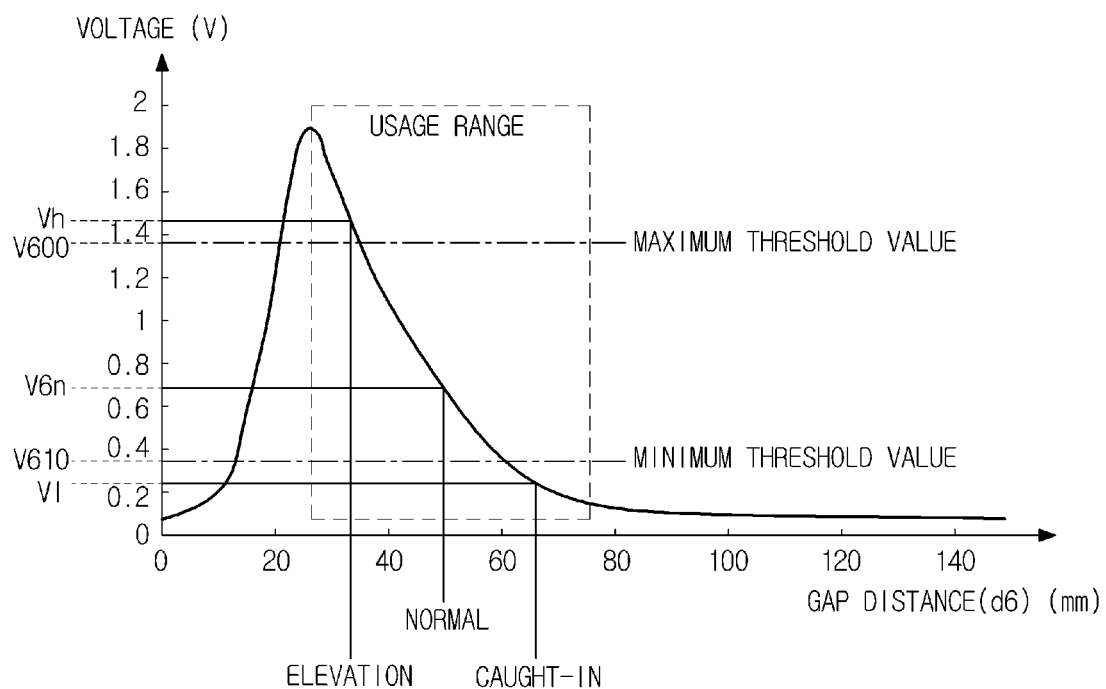
FIG. 19 is a graph illustrating the relationship of the separation distance between the sensor and the sensed body and the voltage generated from the sensor.

FIGS. 18A to 18C are views illustrating the change of the separation distance between the sensor 656 and the sensed body 652, according to displacement of the driving wheel using the example embodiment as shown in FIG. 16. FIG. 19 is a graph illustrating a relationship of the separation distance between the sensor 656 and the sensed body 652 and the voltage generated from the sensor 656.

As shown in FIG. 18A, when the main body 10 travels on the H/F region without encountering any obstacles, a distance d6 between the sensor 656 and the sensed body 652 becomes a reference separation distance d6n. Accordingly, the displacement of the driving wheel 120, according to the reference separation distance d6n becomes 0.

As shown in FIG. 18B, when the main body 10 meets an inclined surface or a climbing obstacle B1 and climbs the inclined surface or the climbing obstacle B1 (with reference to FIGS. 20A to 20D), the gear assembly 140 is rotated in the clockwise direction about the rotation shaft 132 of the driving motor 130 or the second connection protrusion 146 disposed coaxially with the rotation shaft 132, due to the climbing. The sensed body 652 moving together with the gear assembly 140 is also rotated in the clockwise direction. That is, the separation distance d6 between the sensor 656 and the sensed body 652 in the lifted state during the climbing becomes smaller than the reference separation distance d6n due to the rotation of the gear assembly 140 in the clockwise direction.

As shown in FIG. 18C, when the main body 10 meets and is jammed into a jamming obstacle B2, such as a side table (with reference to FIGS. 22A to 22D), the gear assembly 140 is rotated in the counterclockwise direction about the rotation shaft 132 of the driving motor 130 or the second connection protrusion 146, which is disposed coaxially with the rotation shaft 132. The sensed body 652 moving together with the gear assembly 140 is also rotated in the counterclockwise direction. That is, the separation distance d6 between the sensor 656 and the sensed body 652 in the jammed state becomes greater than the reference separation distance d6n, due to the rotation of the gear assembly in the counterclockwise direction.

FIG. 19 is a graph illustrating a reference to detect displacement of the driving wheel 120 by converting the separation distance d6 with the sensed body 652 sensed by the sensor 656 into a standardized parameter, such as voltage. Here, the horizontal axis represents the separation distance d6 between the sensor 656 and the sensed body 652, and the vertical axis represents voltage corresponding to the separation distance d6 between the sensor 656 and the sensed body 652.

As shown in FIG. 19, if the separation distance d6 between the sensor 656 and the sensed body 652 is equal to the reference separation distance d6n (with reference to FIG. 18A), the sensor 656 detects displacement of the driving wheel 120 as '0' by converting the separation distance d6 into reference voltage V6n corresponding to the reference separation distance d6n. As such, reference voltage V6n corresponds to the "NORMAL" indication in FIG. 19.

If the separation distance d6 between the sensor 656 and the sensed body 652 is smaller than the reference separation distance d6n (with reference to FIG. 18B), the sensor 656 detects displacement of the driving wheel 120 as having a positive (+) value by converting the separation distance d6 into voltage higher than the reference voltage V6n corresponding to the reference separation distance d6n. If voltage corresponding to the displacement of the driving wheel 120 detected by the sensor 656 exceeds an upper threshold value V600 of a predetermined reference range, e.g. voltage Vh, the controller 50 judges that the main body 10 is in the lifted state and controls the number of rotations or the rotating direction of the driving motor 130 to change the travelling path of the main body 10.

If the separation distance d6 between the sensor 656 and the sensed body 652 is greater than the reference separation distance d6n, the sensor 656 detects displacement of the driving wheel 120 as having a negative (−) value by converting the separation distance d6 into voltage lower than the reference voltage V6n corresponding to the reference separation distance d6n. If voltage corresponding to the displacement of the driving wheel 120 detected by the sensor 656 does not reach a lower threshold value V610 of the predetermined reference range, e.g. voltage Vl, the controller 50 judges that the main body 10 is in the jammed state and controls the number of rotations or the rotating direction of the driving motor 130 to change the travelling path of the main body 10.

That is, in a usage range R6, as shown in FIG. 19, of the sensor 656, the separation distance d6 between the sensor 656 and the sensed body 652 is in inverse proportion to voltage, and voltage is in direct proportion to displacement of the driving wheel 120.

Hereinafter, a travelling process of the robot cleaner 1 while avoiding the climbing obstacle B1 or the jamming obstacle B2 and a control method of the robot cleaner 1 will be described.

FIGS. 20A to 20D are views illustrating a travelling operation of a robot cleaner in accordance with an example embodiment while avoiding a climbing obstacle B1. FIG. 21 is a graph illustrating a relationship between a travelling distance of the robot cleaner and displacement of a driving wheel during a travelling process of the robot cleaner shown in FIGS. 20A to 20D while avoiding the climbing obstacle. That is, FIGS. 20A through 20D illustrate the clockwise rotation of the gear assembly 140 during the lifting state.

As shown in FIGS. 20A to 20D and FIG. 21, during the travelling process of the main body 10 of the robot cleaner 1 on the floor surface H/F to execute a cleaning operation, the displacement of the driving wheel 120 detected by the sensing unit 150, 250, 350, 450, 550 or 650 is 0 (refer to section (a) of FIG. 21).

Figure 20A:
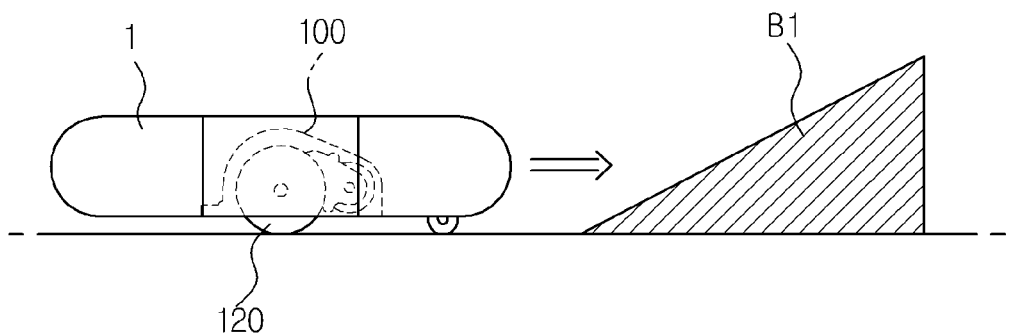
FIGS. 20A to 20D are views illustrating a travelling operation of a robot cleaner in accordance with an embodiment while avoiding a climbing obstacle.
Figure 20B:
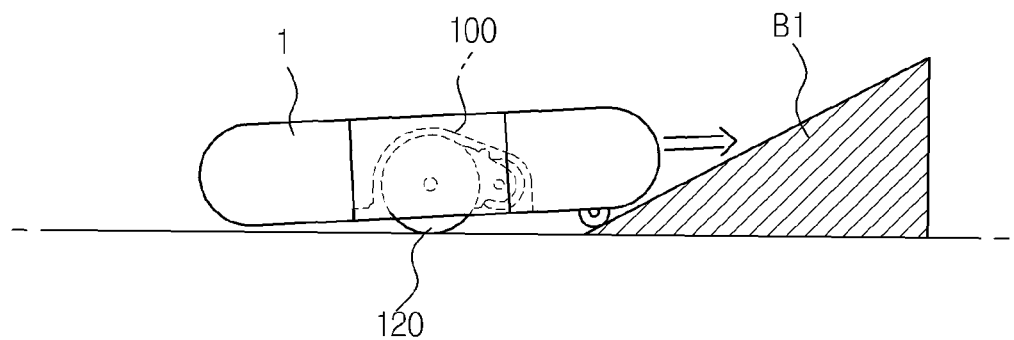
Figure 21:
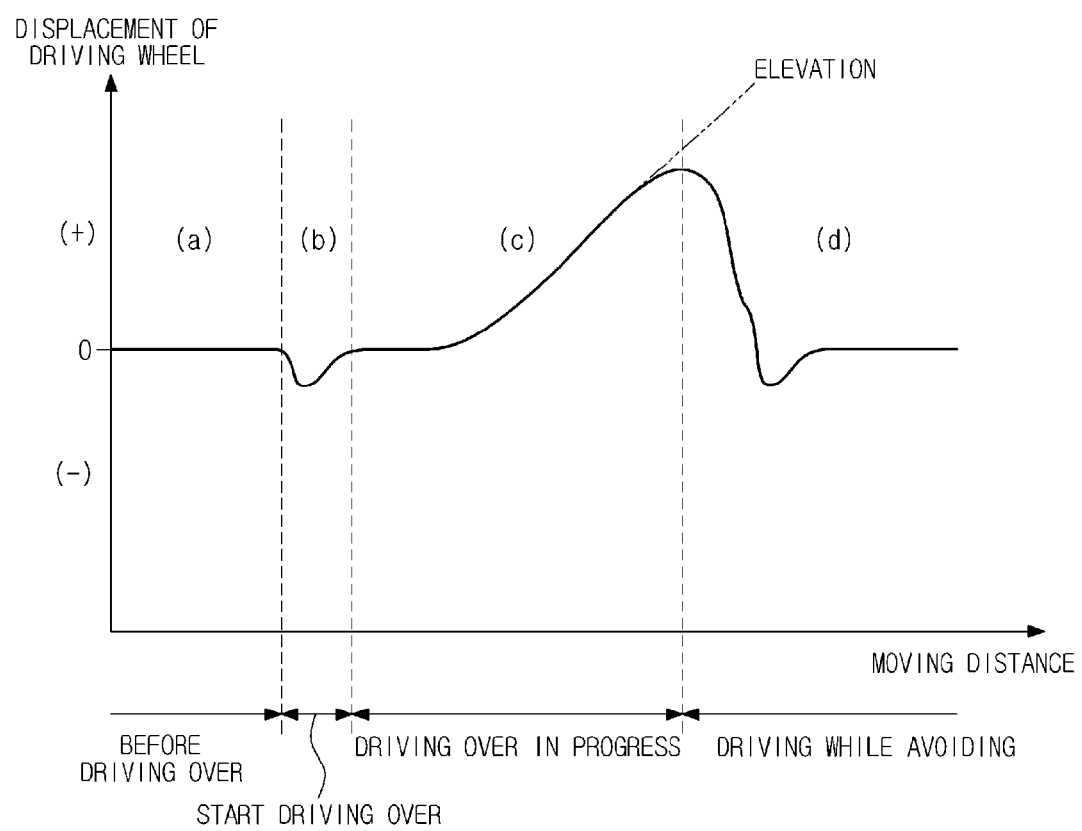
FIG. 21 is a view illustrating a relationship between a travelling distance of the robot cleaner and displacement of a driving wheel during a travelling process of the robot cleaner shown in FIGS. 20A to 20D while avoiding the climbing obstacle.

When the main body 10 of the robot cleaner 1 meets the climbing obstacle B1 and starts climbing of the climbing obstacle B1, the displacement of the driving wheel 120 detected by the sensing unit 150, 250, 350, 450, 550 or 650 temporarily has a negative (−) value (refer to section (b) of FIG. 21), as shown in FIG. 20B.

Figure 20C:
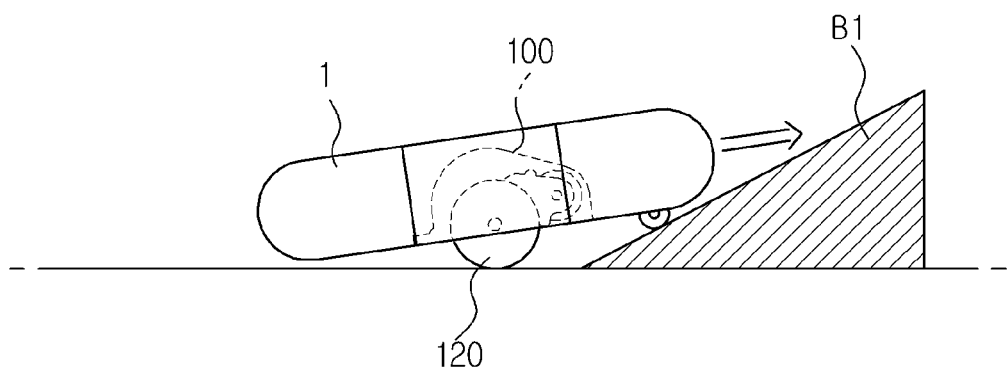

As the main body 10 of the robot cleaner 1 continuously climbs the climbing obstacle B1, the displacement of the driving wheel 120 detected by the sensing unit 150, 250, 350, 450, 550 or 650 is changed from the negative (−) value to a positive (+) value and then the displacement continuously increases in size while maintaining the positive (+) value (refer to section (c) of FIG. 21), as shown in FIG. 20C.

Figure 20D:
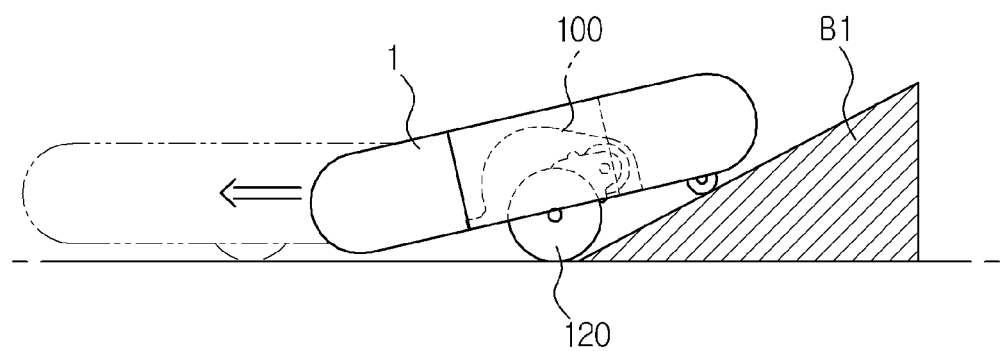

Upon judging that the size of the displacement of the driving wheel 120 detected by the sensing unit 150, 250, 350, 450, 550 or 650 continuously increases and deviates from a predetermined reference range, the control unit 50 changes the travelling path of the main body 10 of the robot cleaner 1 so as to travel while avoiding the climbing obstacle B1 (refer to section (d) of FIG. 21). For example, FIG. 20D shows that the robot cleaner 1 begins to travel away from the climbing obstacle B1.

FIGS. 22A to 22D are views illustrating a travelling operation of a robot cleaner 1 in accordance with another example embodiment while avoiding a jamming obstacle B2. FIG. 23 is a graph illustrating a relationship between a travelling distance of the robot cleaner 1 and displacement of a driving wheel during a travelling process of the robot cleaner 1 shown in FIGS. 22A to 22D while avoiding the jamming obstacle B2.

As shown in FIGS. 22A to 22D and FIG. 23, during the travelling process of the main body 10 of the robot cleaner 1 on the floor surface H/F to execute a cleaning operation, the displacement of the driving wheel 120 detected by the sensing unit 150, 250, 350, 450, 550 or 650 is 0 (refer to section (a) of FIG. 23).

Figure 22A:
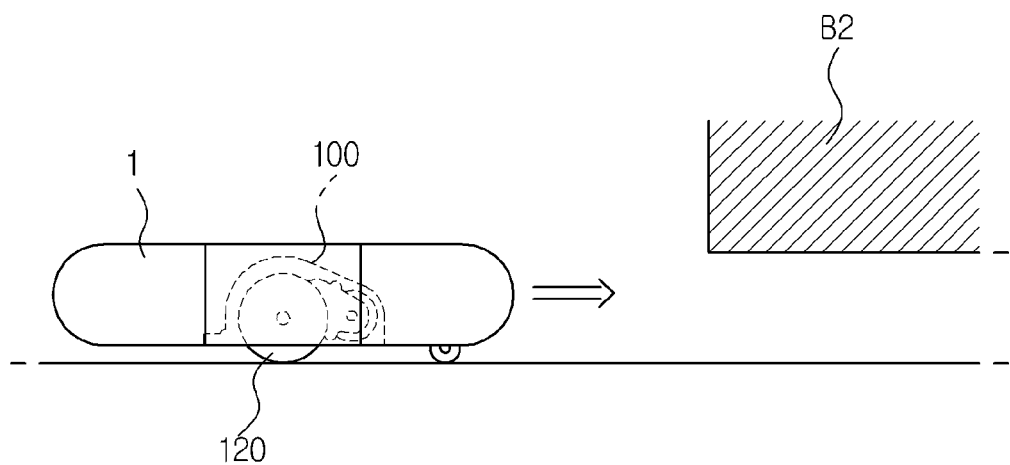
FIGS. 22A to 22D are views illustrating a travelling operation of a robot cleaner in accordance with an example embodiment while avoiding a jamming obstacle.
Figure 22B:
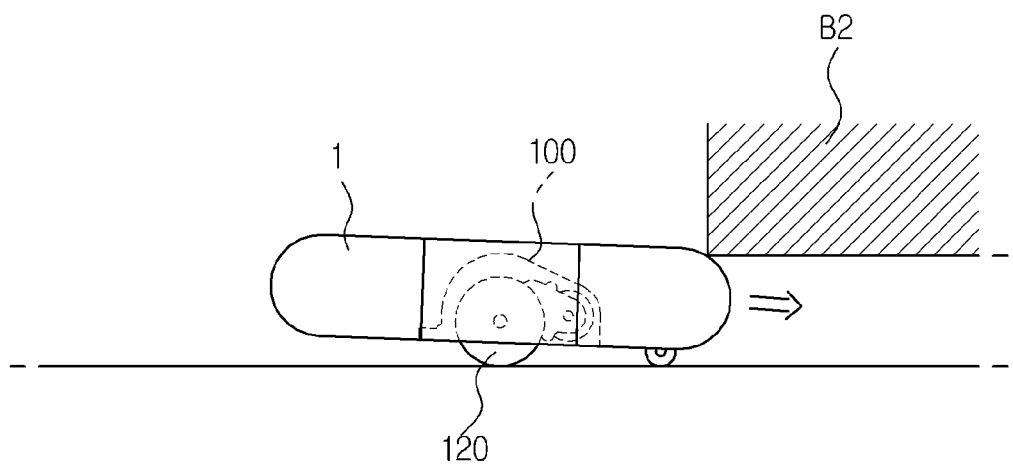
Figure 23:
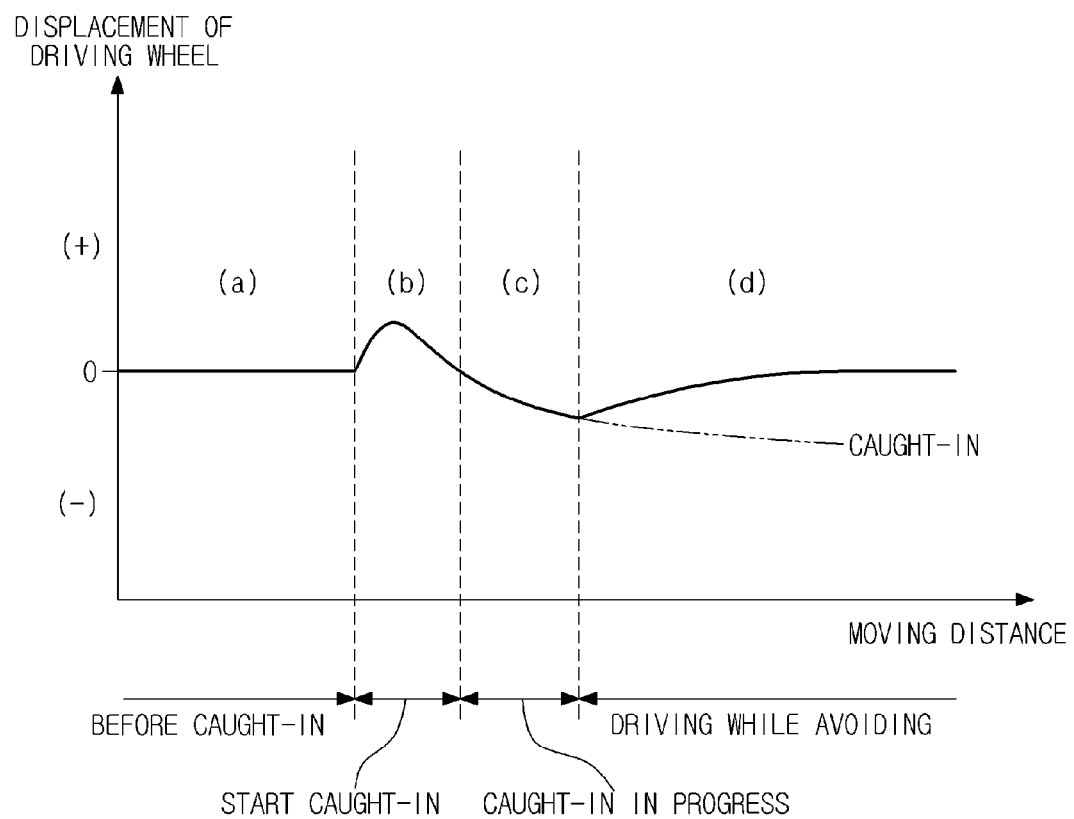
FIG. 23 is a view illustrating the relationship between a travelling distance of the robot cleaner and displacement of a driving wheel during a travelling process of the robot cleaner shown in FIGS. 22A to 22D while avoiding the jamming obstacle.

When the main body 10 of the robot cleaner 1 meets the jamming obstacle B2 and starts jamming into the jamming obstacle B2, the displacement of the driving wheel 120 detected by the sensing unit 150, 250, 350, 450, 550 or 650 temporarily has a positive (+) value (refer to section (b) of FIG. 23), as shown in FIG. 22B.

Figure 22C:
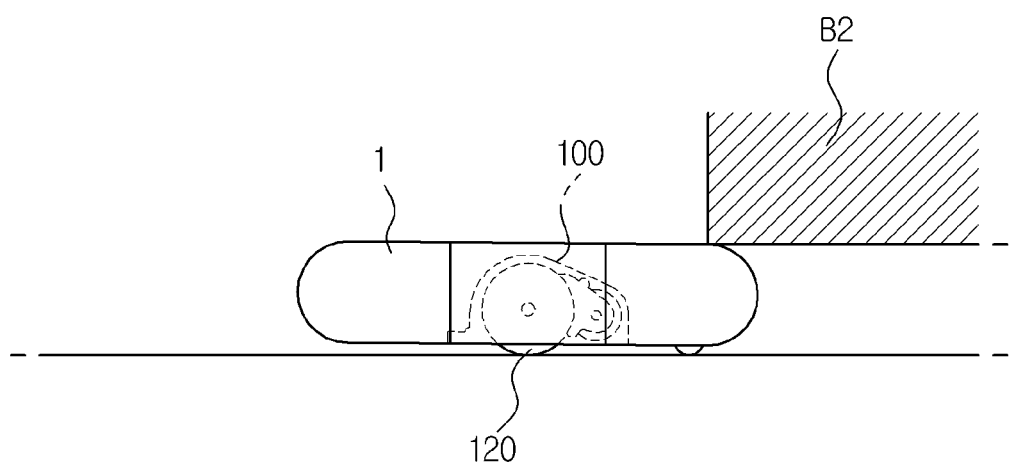
Figure 22D:
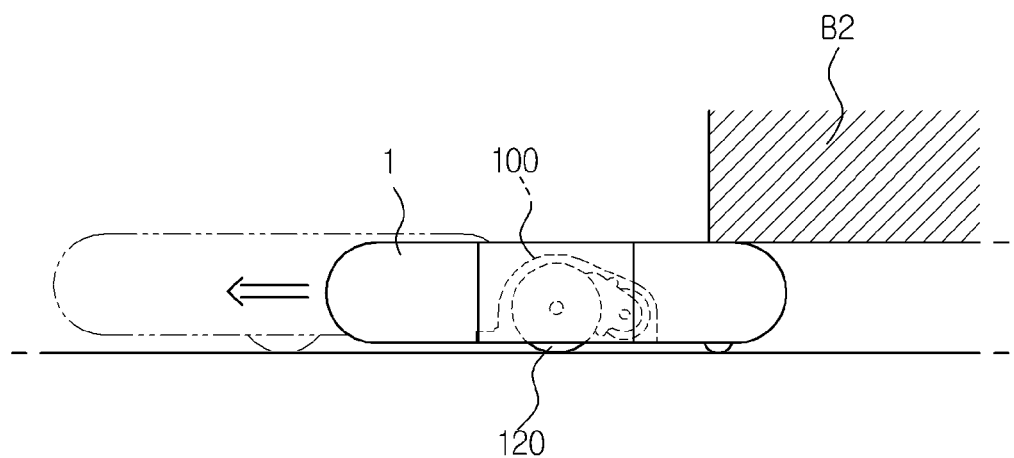

As the main body 10 of the robot cleaner 1 is continuously jammed into the jamming obstacle B2, the displacement of the driving wheel 120 detected by the sensing unit 150, 250, 350, 450, 550 or 650 is changed from the positive (+) value to a negative (−) value and then continuously increases in size while maintaining the negative (−) value (refer to section (c) of FIG. 23), as shown in FIG. 22C.

Upon judging that the size of the displacement of the driving wheel 120 detected by the sensing unit 150, 250, 350, 450, 550 or 650 continuously increases and deviates from a predetermined reference range, the control unit 50 changes the travelling path of the main body 10 of the robot cleaner 1 so as to travel while avoiding the jamming obstacle B2 (refer to section (d) of FIG. 23). For example, the robot cleaner 1 travels away from the jamming obstacle B2.

Figure 24:
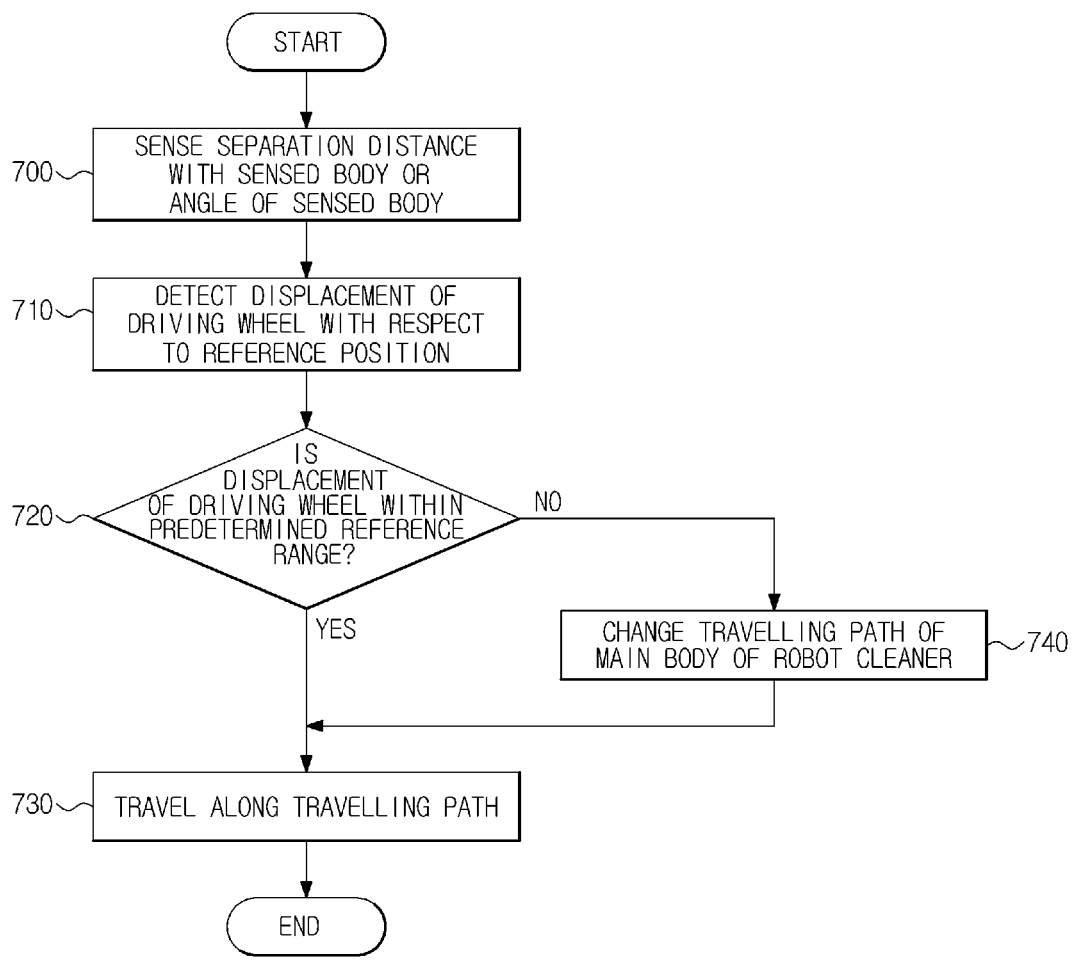
FIG. 24 is a flowchart illustrating a control method of a robot cleaner in accordance with an example embodiment to prevent lifting and jamming of the robot cleaner.

FIG. 24 is a flowchart illustrating a control method of a robot cleaner in accordance with an example embodiment to prevent lifting and jamming of the robot cleaner.

First, the sensing unit 150, 250, 350, 450, 550 or 650 senses a separation distance with the sensed body 152, 252, 352 or 652 or the driving wheel 120 or a rotating angle of the driving wheel 120 (Operation 700), and then detects displacement of the driving wheel 120 with respect to a reference position K (Operation 710). Here, as described above, the sensing unit 150, 250, 350, 450, 550 or 650 detects the displacement of the driving wheel 120 by converting the sensed separation distance or rotating angle into a standardized parameter, such as voltage. Although this example embodiment uses voltage as the standardized parameter, the present disclosure is not limited thereto.

Thereafter, the displacement of the driving wheel 120 detected by the sensing unit 150, 250, 350, 450, 550 or 650 is transmitted to the controller 50, and the controller 50 compares the transmitted displacement of the driving wheel 120 with a predetermined reference range (Operation 720).

Upon judging that the displacement of the driving wheel 120 is within the predetermined reference range, the controller 50 controls the main body 10 of the robot cleaner 1 so as to continuously travel along the current travelling path (Operation 730).

On the other hand, upon judging that the displacement of the driving wheel 120 deviates from the predetermined reference range, the controller 50 changes the current travelling path of the main body 10 of the robot cleaner 1 so as to travel along a new travelling path (Operation 740).

That is, upon judging that the driving wheel 120 is excessively lifted while the main body 10 of the robot cleaner 1 meets the climbing obstacle B1 located on the travelling path and climbs the climbing obstacle B1, the displacement of the driving wheel 120 detected by the sensor 156, 256, 356, 456, 556 or 656 deviates from the predetermined reference range. Then, the controller 50 allows the displacement of the driving wheel 120 to be maintained within the reference range by controlling the main body 10 to travel while avoiding the climbing obstacle B1. Upon judging that the main body 10 of the robot cleaner 1 meets the jamming obstacle B2 located on the travelling path and is excessively jammed into the jamming obstacle B2, the displacement of the driving wheel 120 detected by the sensor 156, 256, 356, 456, 556 or 656 deviates from the predetermined reference range. Then, the controller 50 allows the displacement of the driving wheel 120 to be maintained within the reference range by controlling the main body 10 to travel while avoiding the jamming obstacle B2.

As is apparent from the above description, a robot cleaner and a control method thereof in accordance with example embodiments stably execute a cleaning operation without stoppage of travelling of the robot cleaner due to obstacles present in a space to be cleaned, and a control method thereof.

Although a few embodiments of the present disclosure have been shown and described, it would appreciated by those skilled in the art that changes may be made in these embodiments without departing from the principles and spirit of the disclosure, the scope of which is defined in the claims and their equivalents.

What is claimed is:

1. A control method of a robot cleaner which is provided with a plurality of driving wheel assemblies each of which includes a driving wheel and a gear assembly to transmit driving force to the driving wheel and which rotates due to displacement of the driving wheel, the control method comprising:

for the driving wheel included in each respective driving wheel assembly,
detecting a displacement of the driving wheel with respect to a reference position by sensing a distance between
a sensor provided on the respective driving wheel assembly and
a sensed body provided on the gear assembly included in the respective driving wheel assembly so that the sensed body thereby rotates with the rotation of the gear assembly included in the respective driving wheel assembly;
judging, by a controller, whether or not the detected displacement is within a predetermined reference range; and
changing a travelling path of the robot cleaner, upon judging by said judging that the detected displacement is not within the predetermined reference range.

2. The control method according to claim 1, wherein the sensed body on each respective driving wheel assembly is the driving wheel on the respective driving wheel assembly.

3. The control method according to claim 1, wherein said changing comprises changing the travelling path of the main body so that the detected displacement is within the predetermined reference range, upon judging by said judging that the detected displacement is not within the predetermined reference range.

4. The control method according to claim 1, wherein said changing comprises:
 judging that the driving wheel is lifted, when the detected displacement exceeds an upper threshold value of the predetermined reference range; and
 judging that the driving wheel is jammed, when the detected displacement does not reach a lower threshold value of the predetermined reference range.

5. The control method according to claim 1, wherein the sensed distance is converted into a standardized parameter.

6. The control method according to claim 5, wherein the standardized parameter is voltage, and the predetermined reference range is a range of voltage.

7. A control method of a robot cleaner which is provided with a main body, and a plurality of driving wheel assemblies each of which includes a driving wheel to drive the main body, the control method comprising:
 for the driving wheel included in each respective driving wheel assembly,
 detecting a displacement of the driving wheel with respect to a reference position by sensing a position of a sensed body on the respective driving wheel assembly by a sensor included in the respective driving wheel assembly;
 judging, by a controller, whether or not the detected displacement is within a predetermined reference range; and
 changing a travelling path of the main body, upon judging by said judging that the detected displacement is not within the predetermined reference range,
 wherein
 each respective driving wheel assembly further includes a driving motor to drive the driving wheel included in the respective driving wheel assembly, and
 the sensor included in each respective driving wheel assembly senses a rotating angle of the sensed body on the respective driving wheel assembly about a rotation shaft of the driving motor included in the respective driving wheel assembly, to thereby detect the displacement of the driving wheel included in the respective driving wheel assembly.

8. A robot cleaner comprising:
 plurality of driving wheel assemblies, each respective driving wheel assembly of the plurality of driving wheel assemblies including:
 a driving wheel,
 a gear assembly to transmit driving force to the driving wheel included in the respective driving wheel assembly to thereby drive the robot cleaner, and which rotates due to displacement of the driving wheel included in the respective driving wheel assembly,
 a sensed body provided on the gear assembly included in the respective driving, wheel assembly so that the sensed body rotates with the rotation of the gear assembly included in the respective driving wheel assembly, and
 a sensor to detect a displacement of the driving wheel included in the respective driving wheel assembly with respect to a reference position by sensing a distance between the sensor and the sensed body provided on the gear assembly included in the respective driving wheel assembly; and
 at least one controller to judge whether or not the displacement detected by a respective sensor included in a respective driving wheel assembly is within a predetermined reference range, and to change a travelling path of the robot cleaner, upon judging by the at least one controller that the detected displacement is not within the predetermined reference range.

9. The robot cleaner according to claim 8, wherein the at least one controller changes the travelling path of the robot cleaner so that the detected displacement is within the reference range, upon judging by the at least one controller that the detected displacement is not within the predetermined reference range.

10. The robot cleaner according to claim 9, wherein, for the driving wheel included in each respective driving wheel assembly,
 the at least one controller judges that the driving wheel is lifted, when the detected displacement of the driving wheel exceeds an upper threshold value of the predetermined reference range, and judges that the driving wheel is jammed, when the detected displacement of the driving wheel does not reach a lower threshold value of the predetermined reference range.

11. The robot cleaner according to claim 10, wherein the sensed body provided on each respective driving wheel assembly is the driving wheel included in the respective driving wheel assembly.

12. The robot cleaner according to claim 9, wherein:
 in each respective driving wheel assembly, the sensed body provided on the gear assembly included in the respective driving wheel assembly protrudes from one side surface of the gear assembly included in the respective driving wheel assembly.

13. The robot cleaner according to claim 12, wherein
 each respective driving wheel assembly includes a motor generating the driving force transmitted by the gear assembly included in the respective driving wheel assembly, and,
 for each respective driving wheel assembly of the plurality of driving wheel assemblies,
 the gear assembly included in the respective driving wheel assembly is connected to one side of a housing included in the respective driving wheel assembly so as to be rotatable about a rotation shaft of the driving motor included in the respective driving wheel assembly.

14. The robot cleaner according to claim 13, wherein, for each respective driving wheel assembly of the plurality of driving wheel assemblies:
 a magnet is provided at one end of the sensed body provided on the gear assembly included in the respective driving wheel assembly; and
 the sensor included in the respective driving wheel assembly senses the distance between the sensor and the sensed body provided on the gear assembly included in the respective driving wheel assembly through magnetic interaction with the magnet.

15. The robot cleaner according to claim 13, wherein, for each respective driving wheel assembly among the plurality of driving wheel assemblies:
 a guide slot to accommodate the sensed body provided on the gear assembly included in the respective driving wheel assembly and to guide the sensed body is provided at one side surface of the housing included in the respective driving wheel assembly; and the sensor included in the respective driving wheel assembly is fixed to the guide slot and senses the distance between the sensor and the sensed body provided on the gear assembly included in the respective driving wheel assembly.

16. The robot cleaner according to claim 8, wherein, for the driving wheel included in each respective driving wheel assembly, the sensor converts the sensed distance into a standardized parameter.

17. The control method according to claim 16, wherein the standardized parameter is voltage, and the predetermined reference range is a range of voltage.

18. A robot cleaner which is provided with a main body, and a plurality of driving wheel assemblies, each of which includes a driving wheel to drive the main body, the robot cleaner comprising:
for the driving wheel included in each respective driving wheel assembly of the plurality of driving wheel assemblies,
a sensor to detect a displacement of the driving wheel with respect to a reference position by sensing a sensed body provided on the respective driving wheel assembly; and
a controller to judge whether or not the detected displacement is within a predetermined reference range, and to change a travelling path of the main body, upon judging by the controller that the detected displacement is not within the predetermined reference range,
wherein each respective driving wheel assembly of the plurality of driving wheel assemblies comprises:
a housing; and
a driving motor connected to one side of the housing; and
the sensor senses a rotating angle of the sensed body provided on the respective driving wheel assembly about a rotation shaft of the driving motor included in the respective driving wheel assembly, to thereby detect the displacement of the driving wheel included in the respective driving wheel assembly.

19. A robot cleaner comprising:
a plurality of driving wheel assemblies, each of which comprises:
a driving wheel,
a driving motor to generate a driving force,
a gear assembly to transmit the driving force generated by the driving motor included in the respective driving wheel assembly to the driving wheel included in the respective driving wheel assembly, and which rotates due to displacement of the driving wheel included in the respective driving wheel assembly,
a sensed body provided on the gear assembly included in the respective driving wheel assembly so that the rotation of the gear assembly included in the respective driving wheel assembly causes rotation of the sensed body, and
a sensor which detects displacement of the driving wheel included in the respective driving wheel assembly with respect to a reference position by sensing a distance between the sensed body provided on the gear assembly included in the respective driving wheel assembly and the sensor included in the respective driving wheel assembly.

20. The robot cleaner according to claim 19, wherein, for each respective driving wheel assembly of the plurality of driving wheel assemblies, the sensed body provided on the gear assembly included in the respective driving wheel assembly protrudes from one side surface of the gear assembly included in the respective driving wheel assembly.

21. The robot cleaner according to claim 20, wherein
each respective driving wheel assembly of the plurality of driving wheel assemblies includes a housing, and,
for each respective driving wheel assembly of the plurality of driving wheel assemblies:
the housing included in the respective driving wheel assembly includes a guide part accommodating and guiding the sensed body provided on the gear assembly included in the respective driving wheel assembly; and
the sensor included in the respective driving wheel assembly is fixed to the guide part included in the housing included in the respective driving wheel assembly.

22. A robot cleaner comprising:
a driving wheel;
a driving motor which generates rotary force to rotate the driving wheel;
a gear assembly which transmits the rotary force generated by the driving motor to the driving wheel, and which is rotated by displacement of the driving wheel;
a sensed body provided on the gear assembly so that the sensed body rotates with the rotation of the gear assembly; and
a sensor to detect displacement of the driving wheel with respect to a reference position by sensing a distance between the sensor and the sensed body.

23. The robot cleaner according to claim 22, further comprising:
a controller to judge whether or not the detected displacement is within a predetermined reference range and, when the controller judges that the detected displacement is not within the predetermined range, to change a travelling path of the robot cleaner.

24. A robot cleaner comprising:
a driving wheel;
a motor which generates rotary force to rotate the driving wheel;
a gear assembly which transmits the rotary force generated by the driving motor to the driving wheel, and which is rotated by displacement of the driving wheel;
a sensor to detect a displacement of the driving wheel by detecting a rotation angle of the gear assembly or a rotation angle of the driving wheel.

25. The robot cleaner according to claim 24, wherein the sensor is positioned at a center of rotation of the gear assembly.

26. The robot cleaner according to claim 24, wherein the sensor detects the rotation angle of the gear assembly.

27. The robot cleaner according to claim 24, wherein the sensor detects the rotation angle of the driving wheel.

* * * * *